United States Patent
Satoh et al.

(10) Patent No.: US 8,817,329 B2
(45) Date of Patent: Aug. 26, 2014

(54) COLOR MEASURING DEVICE, IMAGE FORMING APPARATUS, COLOR MEASURING METHOD, AND COLOR MEASURING SYSTEM

(71) Applicants: Nobuyuki Satoh, Kanagawa (JP); Yasuyuki Suzuki, Kanagawa (JP); Masato Kobayashi, Kanagawa (JP); Yuichi Sakurada, Tokyo (JP); Suguru Yokozawa, Kanagawa (JP); Mamoru Yorimoto, Kanagawa (JP); Tatsuhiko Okada, Saitama (JP); Daisaku Horikawa, Saitama (JP); Ryo Honda, Kanagawa (JP)

(72) Inventors: Nobuyuki Satoh, Kanagawa (JP); Yasuyuki Suzuki, Kanagawa (JP); Masato Kobayashi, Kanagawa (JP); Yuichi Sakurada, Tokyo (JP); Suguru Yokozawa, Kanagawa (JP); Mamoru Yorimoto, Kanagawa (JP); Tatsuhiko Okada, Saitama (JP); Daisaku Horikawa, Saitama (JP); Ryo Honda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/768,629

(22) Filed: Feb. 15, 2013

(65) Prior Publication Data
US 2013/0208289 A1    Aug. 15, 2013

(30) Foreign Application Priority Data

Feb. 15, 2012 (JP) .................................. 2012-031036
Jan. 23, 2013 (JP) .................................. 2013-010343

(51) Int. Cl.
*H04N 1/60* (2006.01)
*H04N 1/46* (2006.01)
*G03F 3/08* (2006.01)
*G06K 15/00* (2006.01)
*G06K 9/00* (2006.01)

(52) U.S. Cl.
USPC ........... 358/1.9; 358/504; 358/518; 358/3.06; 382/162; 382/167

(58) Field of Classification Search
USPC .................. 358/1.9, 504, 518, 3.06; 356/402; 382/162, 167
See application file for complete search history.

(56) References Cited

U.S. PATENT DOCUMENTS

| 6,055,074 | A | 4/2000 | Himoto |
| 7,586,642 | B2 * | 9/2009 | Chiba ............................ 358/1.9 |
| 8,274,706 | B2 * | 9/2012 | Monga et al. ................ 358/3.06 |
| 2005/0046883 | A1 | 3/2005 | Chiba |

(Continued)

FOREIGN PATENT DOCUMENTS

| JP | 10-290373 | 10/1998 |
| JP | 2001-229367 | 8/2001 |

(Continued)

*Primary Examiner* — Charlotte M Baker
(74) *Attorney, Agent, or Firm* — Oblon, Spivak, McClelland, Maier & Neustadt, L.L.P.

(57) ABSTRACT

A color measuring device includes a unit configured to calculate a reference-value matrix for converting imaged reference RGB value of a reference color patch a reference colorimetric value of the reference color patch; a unit configured to convert a color-measurement RGB value of a color measurement object into an imaged colorimetric value of the color measurement object by using the corresponding reference-value matrix; a unit configured to select reference color patches of which the reference colorimetric values each have a close distance from the imaged colorimetric value in the predetermined color space; a unit configured to select, as selection RGB values, the imaged reference RGB values of the selected patches; a unit configured to calculate a selection-RGB-value matrix for converting the selection RGB values into the reference colorimetric values; and a unit configured to convert the color-measurement RGB value into a colorimetric value by using the selection-RGB-value matrix.

12 Claims, 28 Drawing Sheets

(56) References Cited

U.S. PATENT DOCUMENTS

| | | |
|---|---|---|
| 2006/0082843 A1 * | 4/2006 | Li et al. .................. 358/504 |
| 2012/0069411 A1 | 3/2012 | Satoh et al. |
| 2013/0027720 A1 | 1/2013 | Satoh et al. |
| 2013/0027721 A1 | 1/2013 | Kobayashi et al. |

FOREIGN PATENT DOCUMENTS

| | | |
|---|---|---|
| JP | 2005-045446 | 2/2005 |
| JP | 2005-079834 | 3/2005 |
| JP | 3671097 | 4/2005 |
| JP | 2005-151089 | 6/2005 |
| JP | 2005-295444 | 10/2005 |
| JP | 2006-179991 | 7/2006 |
| JP | 2006-222783 | 8/2006 |
| JP | 4136820 | 6/2008 |
| JP | 2008-283375 | 11/2008 |
| JP | 2010-271367 | 12/2010 |
| JP | 2012-063270 | 3/2012 |
| JP | 2012-063271 | 3/2012 |

* cited by examiner

INITIAL REFERENCE RGB VALUE RdGdBd (44)

MEMORY TABLE Tb1

| PATCH NUMBER | Rd | Gd | Bd | Ld | ad | bd | xd | yd | zd |
|---|---|---|---|---|---|---|---|---|---|
| 1 | 3 | 8 | 5 | 6 | 7 | 2 | | | |
| 2 | | | | | | | | | |
| 3 | | | | | | | | | |
| .. | | | | | | | | | |
| .. | | | | | | | | | |
| | | | | | | | | | |
| .. | | | | | | | | | |
| 72 | | | | | | | | | |

| PATCH NUMBER | REFERENCE COLORIMETRIC VALUE (Lab VALUE) | | | ESTIMATED Lab VALUE | | |
|---|---|---|---|---|---|---|
| | L | a | b | L | a | b |
| 1 | 42 | -5 | -6 | 43 | -20 | -3 |
| 2 | 20 | .. | .. | .. | .. | .. |
| 3 | 60 | .. | .. | .. | .. | .. |
| 4 | .. | | | | | |
| . | .. | | | | | |
| . | | | | | | |
| | | | | | | |
| . | | | | | | |
| 928 | | | | | | |

INVERSE LINEAR TRANSFORMATION MATRIX

AVERAGE COLOR DIFFERENCE: 3.1   MAXIMUM COLOR DIFFERENCE: 41.3

AVERAGE COLOR DIFFERENCE: 2.8   MAXIMUM COLOR DIFFERENCE: 12.8

AVERAGE COLOR DIFFERENCE: 1.5   MAXIMUM COLOR DIFFERENCE: 11.7

COLOR MEASURING DEVICE, IMAGE FORMING APPARATUS, COLOR MEASURING METHOD, AND COLOR MEASURING SYSTEM

CROSS-REFERENCE TO RELATED APPLICATIONS

The present application claims priority to and incorporates by reference the entire contents of Japanese Patent Application No. 2012-031036 filed in Japan on Feb. 15, 2012 and Japanese Patent Application No. 2013-010343 filed in Japan on Jan. 23, 2013.

BACKGROUND OF THE INVENTION

1. Field of the Invention

The present invention relates to a color measuring device, an image forming apparatus, a color measuring method, and a color measuring system.

2. Description of the Related Art

An image forming apparatus, such as a color inkjet image forming apparatus or a color electrophotographic image forming apparatus, is becoming able to provide a higher image quality and is increasingly used for offset printing of advertising media, brochures, or the like, for which high-quality images are required although the number of copies to be printed is relatively small.

In the offset printing that requires a high image quality, in some cases, colors actually printed out by the image forming apparatus may differ from colors of a printing material desired by a customer.

In general, the customer checks the colors of the printing material on a display and then orders printing. However, the image forming apparatus has specific color reproduction characteristics according to each model, so that printed colors may differ from the colors checked on the display.

Therefore, a technology has been employed to reproduce colors by using a color space, such as the Lab color space or the xyz color space, that is independent of a device, such as a display or an image forming apparatus.

In addition, the image forming apparatus controls the amount of color materials in order to output a designated color. For example, an inkjet image forming apparatus calculates an ink ejection amount or a print pattern to control the amount of ink ejected from an ink head, thereby controlling output colors. For another example, an electrophotographic image forming apparatus controls the amount of toner attached to a photoreceptor or controls the intensity of a laser beam, thereby controlling output colors.

However, the amount of color materials, such as the ink ejection amount of the inkjet image forming apparatus, varies depending on the state of a head nozzle, depending on a variation in the viscosity of ink, or depending on a variation in an ejection driving element (e.g., a piezoelectric element), resulting in a variation in the color reproducibility. Moreover, the ink ejection amount of the inkjet image forming apparatus may change over time in the same image forming apparatus or may vary between different image forming apparatuses. Therefore, the color reproducibility of an image varies over time or between image forming apparatuses.

Therefore, a technology has been employed, in which a test pattern is printed out, colors of the printed test pattern are measured, and the ink ejection amount or image data is corrected so that a target color can be reproduced in a printed material.

Specifically, there has been proposed a method for generating a color conversion table to be referred to for converting a primary color value in a primary color space into a target color value in a target color space (see Japanese Patent Application Laid-open No. 2006-222783). In the conventional technology, a plurality of color patches contained in a predetermined region near a lattice-point of interest in the primary color space are selected from among color patches, primary color values in the primary color space are obtained by capturing the selected color patches by a photoelectric conversion element, intermediate color values in an intermediate color space are obtained by measuring colors of the selected color patches, and an individual transformation matrix coefficient to transform the primary color space into the intermediate color space is obtained for the lattice-point of interest by using a set of the primary color values and the intermediate color values of the selected color patches. Subsequently, the above process is repeated to obtain the individual transformation matrix coefficients of a plurality of lattice-points of interest, and thereafter, individual intermediate color values corresponding to the respective lattice-points of interest are calculated by using the obtained individual transformation matrix coefficients, target color values in the target color space corresponding to the calculated individual intermediate color values are obtained, and the lattice-points of interest and the target color values are associated with each other, so that the color conversion table for transforming the primary color space into the target color space is generated.

More specifically, in the conventional technology, a color transformation matrix is generated based on the intermediate color values of the color patches whose colors are measured in only a local space of the lattice-point of interest by a spectrophotometric color measuring device, and then a table for transforming the primary color space into the target color space is generated.

However, in the conventional technology, the color transformation matrix is generated based on the intermediate color values of the color patches whose colors are measured in only the local space of the lattice-point of interest by the spectrophotometric color measuring device and then the table for transforming the primary color space into the target color space is generated; therefore, to correct the color reproducibility influenced by a temporal change or by an individual variability of an image forming device, such as a recording head of an inkjet image forming apparatus or an image forming unit of an electrophotographic image forming apparatus, it is necessary to frequently update the color transformation matrix by measuring colors by the spectrophotometric color measuring device. Therefore, costs for the image forming apparatus itself or operation costs increase. Furthermore, in the conventional technology, because the color transformation matrix used to generate the conversion table to transform the primary color space into the target color space is generated by using the intermediate color values of the color patches whose colors are measured in only the local space of the lattice-point of interest, the local space region is separated. Therefore, if sample data points are disproportionately distributed in a selected neighboring space, a distortion error in a linear transformation result increases, resulting in the reduced color reproducibility.

Therefore, there is a need to realize stable color reproduction with reduced distortion at low costs.

SUMMARY OF THE INVENTION

It is an object of the present invention to at least partially solve the problems in the conventional technology.

According to an embodiment, there is provided a color measuring device that includes an obtaining unit configured to obtain RGB values of an object whose color is to be measured; a reference value storage unit configured to store reference colorimetric values and imaged reference RGB values in association with each other, the reference colorimetric values being device-independent colorimetric values of respective colors of reference color patches in a predetermined color space, the imaged reference RGB values being RGB values of the respective colors of the reference color patches that are obtained as the object by the obtaining unit; a reference-value linear transformation matrix calculating unit configured to calculate a reference-value linear transformation matrix for converting the imaged reference RGB value into the reference colorimetric value for each of the reference color patches; an imaged colorimetric value calculating unit configured to convert a color-measurement RGB value of a predetermined color measurement object obtained by the obtaining unit into an imaged colorimetric value by using the corresponding reference-value linear transformation matrix to calculate the imaged colorimetric value of the predetermined color measurement object; a patch selecting unit configured to select a predetermined number of reference color patches of which the reference colorimetric values each have a close distance from the imaged colorimetric value in the predetermined color space, from among the reference color patches; an RGB selecting unit configured to select, as selection RGB values, the imaged reference RGB values of the selected reference color patches; a selection-RGB-value linear transformation matrix calculating unit configured to calculate a selection-RGB-value linear transformation matrix for converting the selection RGB values into the reference colorimetric values; and a colorimetric value converting unit configured to convert the color-measurement RGB value of the color measurement object obtained by the obtaining unit into a colorimetric value by using the selection-RGB-value linear transformation matrix.

According to another embodiment, there is provided an image forming apparatus that includes the color measuring device according to the above embodiment; and an image forming unit configured to form an image by using color image data adjusted based on the colorimetric value converted by the colorimetric value converting unit of the color measuring device.

According to still another embodiment, there is provided a color measuring method that includes obtaining RGB values of an object whose color is to be measured; storing reference colorimetric values and imaged reference RGB values in association with each other, the reference colorimetric values being device-independent colorimetric values of respective colors of reference color patches in a predetermined color space, the imaged reference RGB values being RGB values of the respective colors of the reference color patches that are obtained as the object at the obtaining; calculating a reference-value linear transformation matrix for converting the imaged reference RGB value into the reference colorimetric value for each of the reference color patches; converting a color-measurement RGB value of a predetermined color measurement object obtained at the obtaining into an imaged colorimetric value by using the corresponding reference-value linear transformation matrix to calculate the imaged colorimetric value of the predetermined color measurement object; selecting a predetermined number of reference color patches of which the reference colorimetric values each have a close distance from the imaged colorimetric value in the predetermined color space, from among the reference color patches; selecting, as selection RGB values, the imaged reference RGB values of the selected reference color patches; calculating a selection-RGB-value linear transformation matrix for converting the selection RGB values into the reference colorimetric values; and converting the color-measurement RGB value of the color measurement object obtained at the obtaining into a colorimetric value by using the selection-RGB-value linear transformation matrix.

According to still another embodiment, there is provided a color measuring system that includes an imaging device configured to obtain RGB values of an object whose color is to be measured; and a color measuring device connected to the imaging device via a predetermined communicating unit. The color measuring device includes a reference value storage unit configured to store reference colorimetric values and imaged reference RGB values in association with each other, the reference colorimetric values being device-independent colorimetric values of respective colors of reference color patches in a predetermined color space, the imaged reference RGB values being RGB values of the respective colors of the reference color patches that are obtained as the object by the obtaining unit; a reference-value linear transformation matrix calculating unit configured to calculate a reference-value linear transformation matrix for converting the imaged reference RGB value into the reference colorimetric value for each of the reference color patches; an imaged colorimetric value calculating unit configured to convert a color-measurement RGB value of a predetermined color measurement object obtained by the obtaining unit into an imaged colorimetric value by using the corresponding reference-value linear transformation matrix to calculate the imaged colorimetric value of the predetermined color measurement object; a patch selecting unit configured to select a predetermined number of reference color patches of which the reference colorimetric values each have a close distance from the imaged colorimetric value in the predetermined color space, from among the reference color patches; an RGB selecting unit configured to select, as selection RGB values, the imaged reference RGB values of the selected reference color patches; a selection-RGB-value linear transformation matrix calculating unit configured to calculate a selection-RGB-value linear transformation matrix for converting the selection RGB values into the reference colorimetric values; and a colorimetric value converting unit configured to convert the color-measurement RGB value of the color measurement object obtained by the obtaining unit into a colorimetric value by using the selection-RGB-value linear transformation matrix.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. The embodiments described below are preferred embodiments of the present invention and various technically-preferred limitations are made. However, the present invention is not unreasonably limited by the explanation below. Besides, not all components explained in the embodiments below are always needed as the components of the present invention.

In the following explanation, "Lab (a Lab value)" means, for example, a CIELAB (CIE 1976 L*a*b) color space (or a value in the CIELAB color space). "L*a*b*" will be described as "Lab" below for convenience of explanation.

First Embodiment

Figure 1:
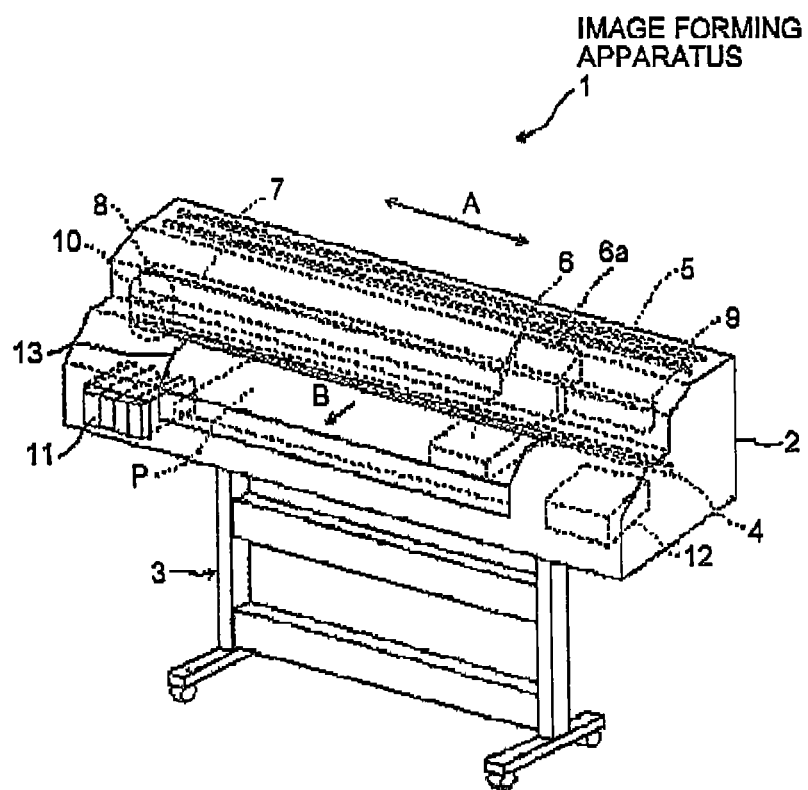
FIG. 1 is a schematic perspective view of an image forming apparatus according to a first embodiment of the present invention.

FIG. 1 to FIG. 10 are diagrams illustrating a color measuring device, an image forming apparatus, a color measuring method, and a color measuring system according to a first embodiment of the present invention. Specifically, FIG. 1 is a schematic perspective view of an image forming apparatus 1 to which the color measuring device, the image forming apparatus, the color measuring method, and the color measuring system according to the first embodiment of the present invention are applied.

In FIG. 1, the image forming apparatus 1 includes a main-body housing 2 mounted on a main-body frame 3. In the main-body housing 2, a main guide rod 4 and a sub guide rod 5 are extended in the main-scanning direction indicated by a double-headed arrow A in FIG. 1. The main guide rod 4 supports a carriage 6 in a movable manner. The carriage 6 includes a connection piece 6a that is engaged with the sub guide rod 5 to stabilize the posture of the carriage 6. The image forming apparatus 1 includes a timing belt 7 in the form of an endless belt along the main guide rod 4. The timing belt 7 is stretched between a drive pulley 8 and a driven pulley 9. The drive pulley 8 is driven to rotate by a main-scanning motor 10, and the driven pulley 9 is arranged so as to give a predetermined tension to the timing belt 7. The drive pulley 8 is driven to rotate by the main-scanning motor 10 to thereby rotate the timing belt 7 in the main-scanning direction according to the rotation direction.

The carriage 6 is connected to the timing belt 7 and moves back and forth in the main-scanning direction along the main guide rod 4 while the timing belt 7 is rotated in the main-scanning direction by the drive pulley 8.

The image forming apparatus 1 includes a cartridge section 11 and a maintenance mechanism 12, which are housed at both corner portions of the main-body housing 2 in the main-scanning direction. The cartridge section 11 houses cartridges containing ink of respective colors of yellow (Y), magenta (M), cyan (C), and black (K) in a replaceable manner. The cartridges in the cartridge section 11 are connected to recording heads 20y, 20m, 20c, and 20k for the respective colors (see FIG. 2) of a recording head 20 on the carriage 6 by pipes (not illustrated). Each of the cartridges supplies ink to a corresponding one of the recording heads 20y, 20m, 20c, and 20k through the pipe. In the following explanation, the recording heads 20y, 20m, 20c, and 20k may be collectively referred to as the recording head 20.

The image forming apparatus 1 outputs or records an image on a recording medium P by ejecting ink to the recording medium P intermittently conveyed in the sub-scanning direction (an arrow B direction in FIG. 1) perpendicular to the main-scanning direction on a platen 14 (see FIG. 2) while moving the carriage 6 in the main-scanning direction as described below.

Specifically, the image forming apparatus 1 according to the first embodiment intermittently conveys the recording medium P in the sub-scanning direction, and, while the conveyance of the recording medium P in the sub-scanning direction is suspended, ejects ink from a nozzle array of the recording head 20 mounted on the carriage 6 onto the recording medium P on the platen 14 by moving the carriage 6 in the main-scanning direction, thereby forming an image on the recording medium P.

The maintenance mechanism 12 cleans an ejection surface of the recording head 20, performs capping, or ejects unnecessary ink in order to discharge unnecessary ink from the recording head 20 or maintain the reliability of the recording head 20.

The image forming apparatus 1 includes a cover 13 that can be opened and closed at a conveying section of the recording medium P. When a maintenance operation is performed on the image forming apparatus 1 or a jam occurs in the image forming apparatus 1, the cover 13 is opened to perform maintenance of the interior of the main-body housing 2 or to remove a jammed recording medium P.

Figure 2:
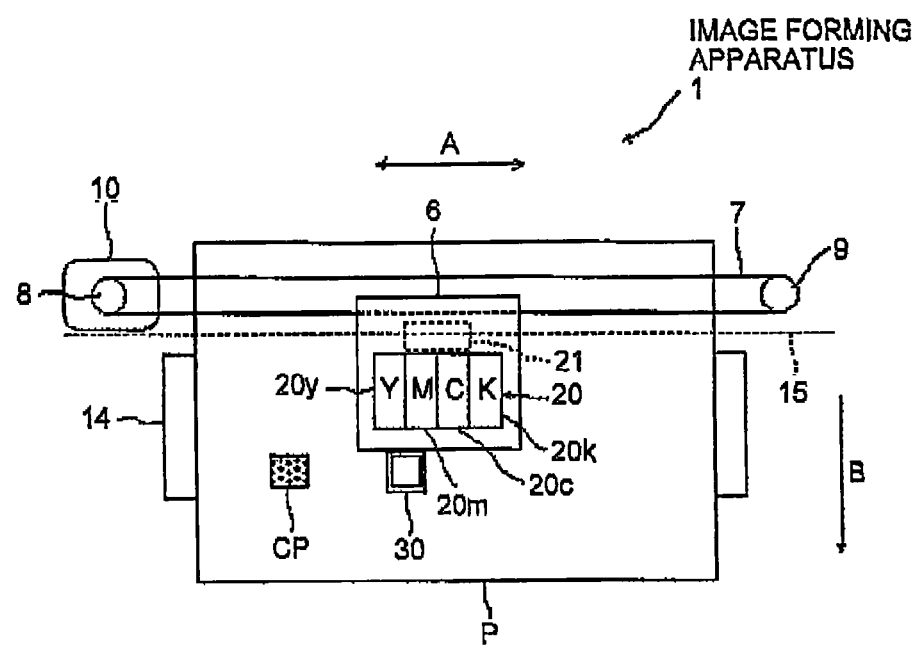
FIG. 2 is a plan view of a carriage section.

As illustrated in FIG. 2, the recording heads 20y, 20m, 20c, and 20k are mounted on the carriage 6. The recording heads 20y, 20m, 20c, and 20k are connected to the cartridges of the respective colors in the cartridge section 11 via the pipes, and eject ink of the respective colors onto a recording medium P opposed to the recording heads. Specifically, the recording head 20y ejects yellow (Y) ink, the recording head 20m ejects magenta (M) ink, the recording head 20c ejects cyan (C) ink, and the recording head 20k ejects black (K) ink.

The recording head 20 is mounted on the carriage 6 such that the ejection surface (nozzle surface) faces downward in FIG. 1 (toward the recording medium P side), and ejects ink onto the recording medium P.

The image forming apparatus 1 includes an encoder sheet 15 parallel to the timing belt 7, that is, parallel to the main guide rod 4, so as to cover at least the moving range of the carriage 6. An encoder sensor 21 that reads the encoder sheet 15 is provided on the carriage 6. The image forming apparatus 1 controls driving of the main-scanning motor 10 based on a reading result that the encoder sensor 21 has obtained from the encoder sheet 15, and controls movement of the carriage 6 in the main-scanning direction.

Figure 3:
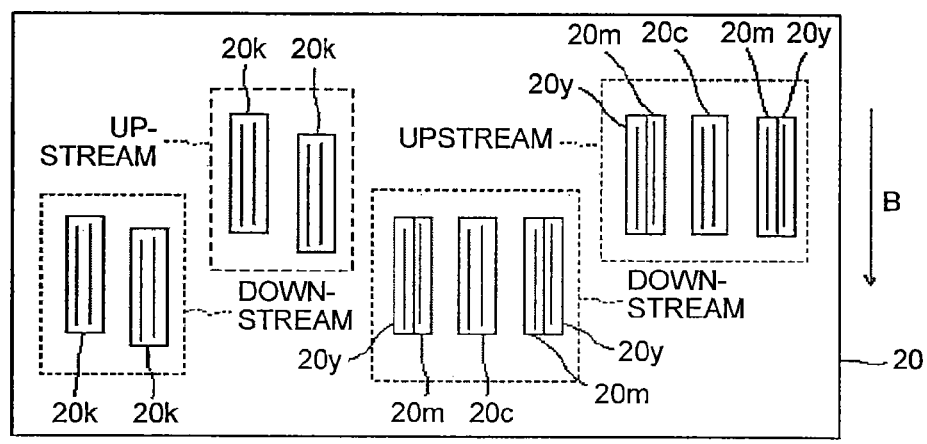
FIG. 3 is a layout diagram of recording heads.

In the recording head 20 mounted on the carriage 6, as illustrated in FIG. 3, the recording heads 20y, 20m, 20c, and 20k are arranged in a plurality of nozzle arrays. By ejecting ink from the nozzle arrays onto the recording medium P conveyed on the platen 14, an image is formed on the recording medium P. To ensure a large width of an image to be formed on the recording medium P by one sweep of scanning of the carriage 6, the image forming apparatus 1 is configured such that the recording head 20 located upstream and the recording head 20 located downstream are mounted on the carriage 6. To improve the print speed for black, the recording heads 20k that eject black ink are mounted on the carriage 6 twice as many as each of the recording heads 20y, 20m, and 20c that eject color ink. Moreover, each of the recording heads 20y and 20m is divided in the main-scanning direction and the divided parts are arranged side by side so as to keep the order of colors superimposed by the reciprocation of the carriage 6 and prevent a change in the order of colors between the forward movement and the backward movement. The layout of the recording heads 20y, 20m, 20c, and 20k of the recording head 20 is not limited to the layout illustrated in FIG. 3.

As illustrated in FIG. 2, an obtaining unit 30 is mounted on the carriage 6. The obtaining unit 30 captures an object (a color measurement object) to measure colors of the object in a color adjustment process to be described later.

Figure 4:
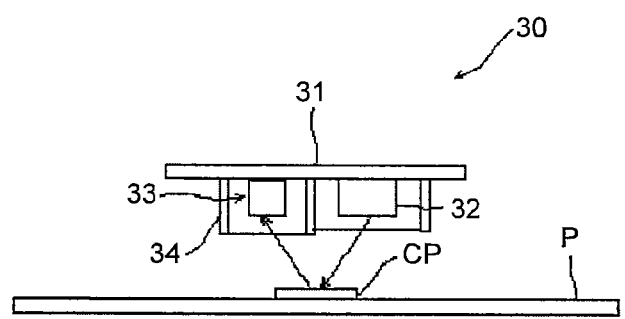
FIG. 4 is a front view of an obtaining unit.
Figure 5:
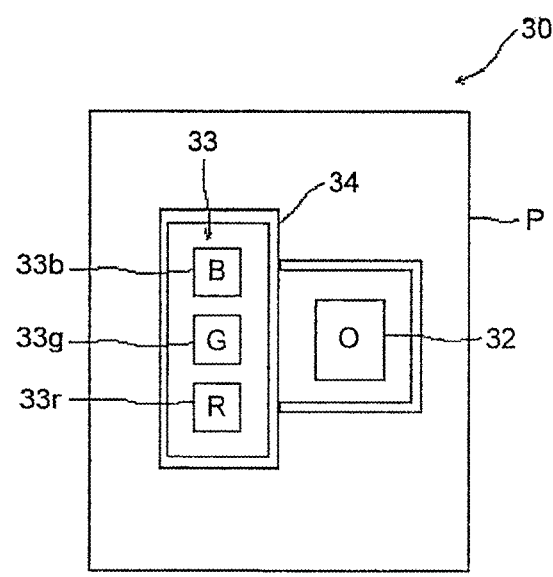
FIG. 5 is a bottom view of the obtaining unit.

As illustrated in FIG. 4, the obtaining unit 30 includes a light source 32, a light-receiving element section 33, and a light blocking wall 34, all of which are mounted on a printed board 31 fixed to the carriage 6. As illustrated in FIG. 5, the light blocking wall 34 is arranged so as to surround the light source 32 and the light-receiving element section 33 to block the influence of external light and prevent light of the light source 32 from directly entering the light-receiving element section 33 (to block stray light).

An LED (Light Emitting Diode) for example is used as the light source 32. As illustrated in FIG. 4, the light source 32 applies reading light (indicated by an arrow in FIG. 4) to an object, such as a color measurement adjustment patch CP recorded on the recording medium P. The reflected light (diffuse reflected light or specular reflected light) is incident on the light-receiving element section 33. The light source 32 is not limited to the LED. For example, an organic EL may be used as the light source 32. If the organic EL is used as the light source 32, illumination light with a spectral distribution similar to that of sunlight can be obtained, so that the color measurement accuracy can be improved.

As illustrated in FIG. 5, the light-receiving element section 33 includes a plurality of light-receiving elements 33r, 33g, and 33b with different spectral sensitivities (RGB sensitivities). In FIG. 5, the three light-receiving elements 33r, 33g, and 33b with the RGB sensitivities are arranged in the light-receiving element section 33. It may be possible to additionally arrange a light-receiving element with a spectral sensitivity to other color, such as gray, cyan, or orange in the light-receiving element section 33. The light-receiving elements 33r, 33g, and 33b output RGB signals corresponding to the intensity of received light. The obtaining unit 30 amplifies the RGB signals output by the light-receiving elements 33r, 33g, and 33b by using an amplifier 35 (see FIG. 7), converts the signals into digital values by using an A/D (analog to digital) converter 36 (see FIG. 7), and outputs the digital values to a CPU (Central Processing Unit) 41 (see FIG. 7). For example, photodiodes are used as the light-receiving elements 33r, 33g, and 33b.

Figure 6:
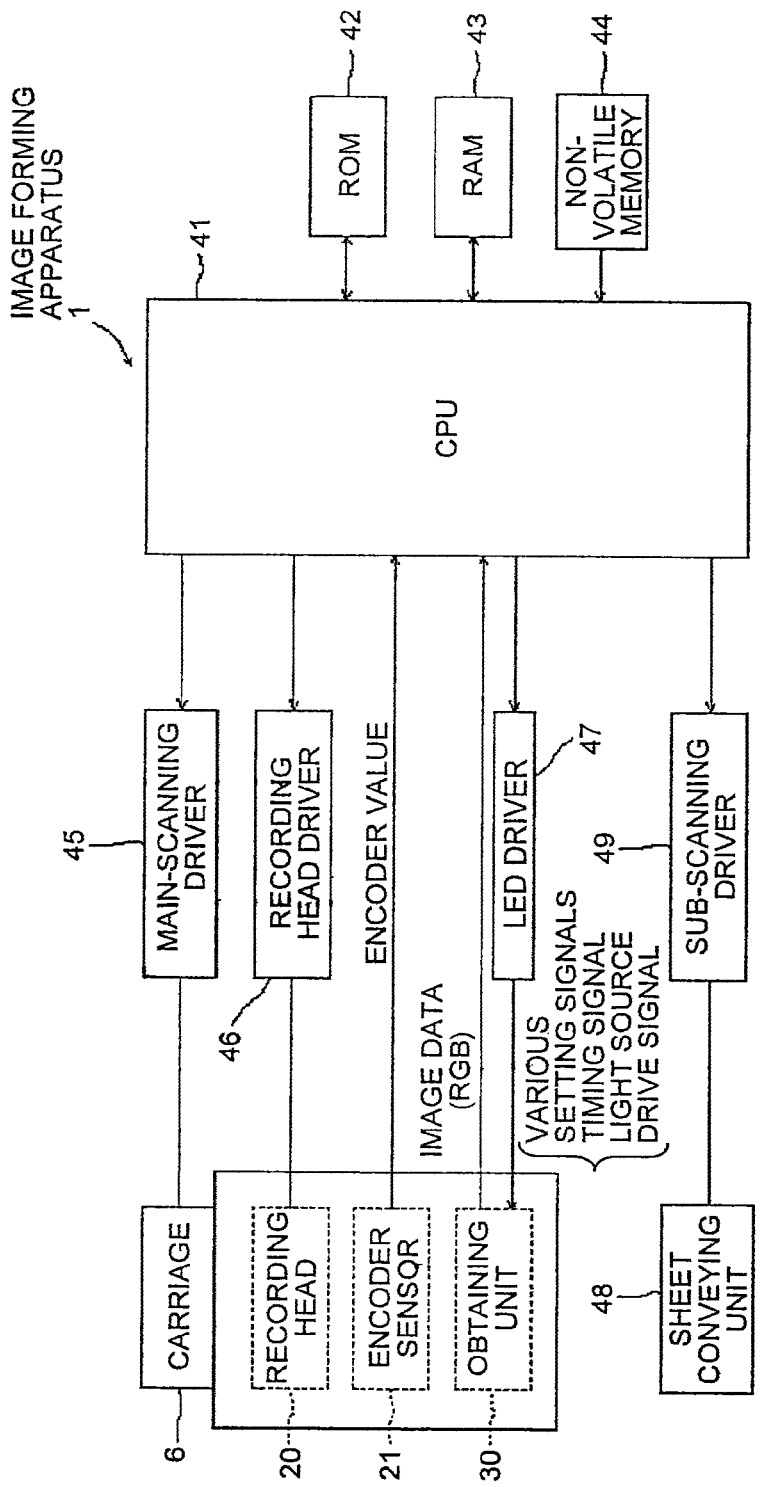
FIG. 6 is a block diagram illustrating a configuration of main parts of the image forming apparatus.

The image forming apparatus 1 is configured as illustrated in a block diagram in FIG. 6. Specifically, the image forming apparatus 1 includes the CPU 41, a ROM (Read Only Memory) 42, a RAM (Random Access Memory) 43, a non-volatile memory 44, a main-scanning driver 45, a recording head driver 46, an LED driver 47, a sheet conveying unit 48, and a sub-scanning driver 49. The image forming apparatus 1 also includes the recording head 20, the encoder sensor 21, and the obtaining unit 30, all of which are mounted on the carriage 6 as described above.

The ROM 42 stores therein programs, such as a basic program of the image forming apparatus 1, a color measurement processing program, and a color adjustment processing program, and necessary system data. The CPU 41 controls each of the units of the image forming apparatus 1 to execute basic processes of the image forming apparatus 1 based on the programs stored in the ROM 42 by using the RAM 43 as a working memory. The CPU 41 obtains colorimetric values for color adjustment on the basis of RGB values captured by the obtaining unit 30, and performs a color adjustment process based on the colorimetric values when forming an image. Regarding the control of the carriage 6 and the sheet conveying unit 48, the CPU 41 controls the movement of the carriage 6 in the main-scanning direction by controlling driving of the main-scanning driver 45 based on an encoder value obtained by the encoder sensor 21. The CPU 41 controls driving of the sheet conveying unit 48, such as a sub-scanning motor or a conveying roller (not illustrated), via the sub-scanning driver 49. The CPU 41 also controls an ink ejection timing and an ink ejection amount of the recording head 20 via the recording head driver 46. The CPU 41 controls lighting of the obtaining unit 30 by controlling the LED driver 47. As will be described later, the CPU 41 functions as a reference-value linear transformation matrix calculating unit that generates a reference-value linear transformation matrix (a first linear transformation matrix), an imaged colorimetric value calculating unit that calculates an imaged colorimetric value, a patch selecting unit that selects a reference color patch, an RGB value selecting unit that selects a selection RGB value, a selection-RGB-value linear transformation matrix calculating unit that generates a selection-RGB-value linear transformation matrix (a second linear transformation matrix), a colorimetric value converting unit that converts an RGB value into a colorimetric value.

As described above, to generate a colorimetric value for color adjustment to accurately reproduce colors desired by a user in image data of an image to be output or recorded, the obtaining unit 30 captures a patch image PG formed on the recording medium P by the recording head 20 and outputs the captured RGB value to the CPU 41 upon color measurement.

Figure 7:
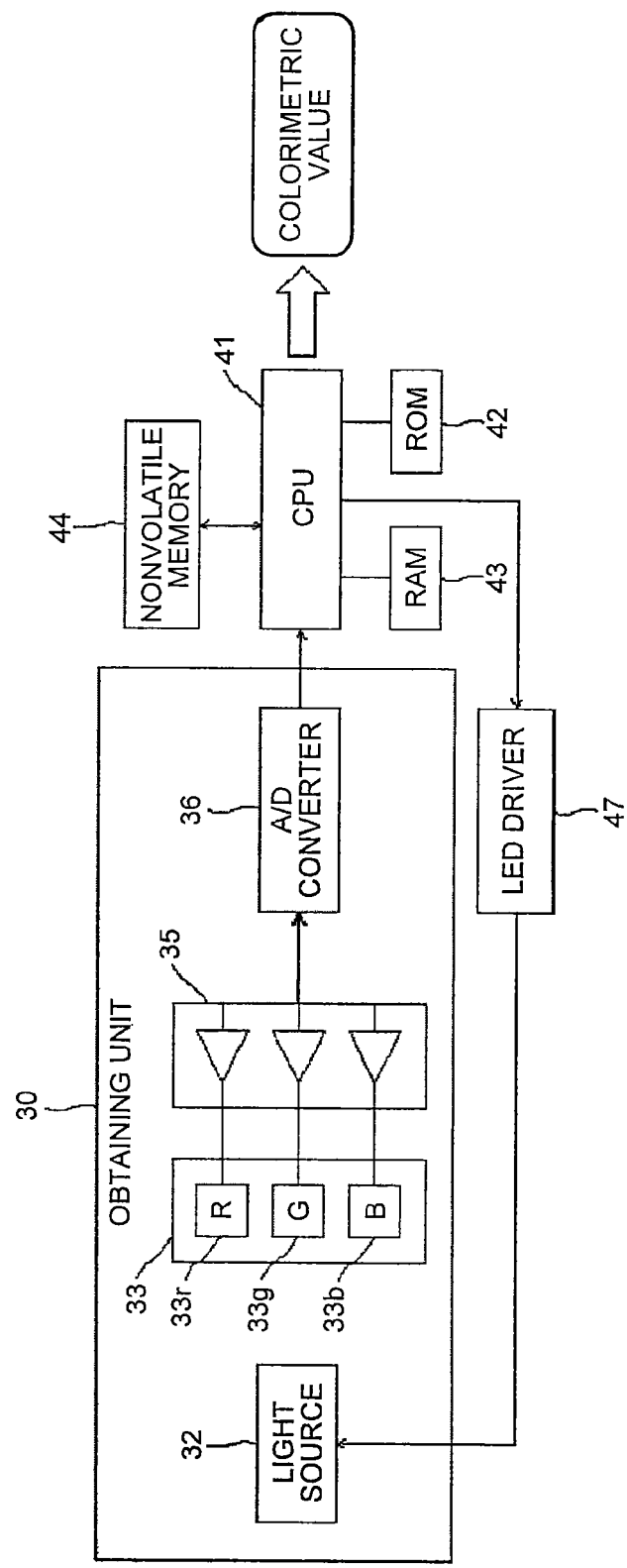
FIG. 7 is a block diagram illustrating a configuration of the obtaining unit.

As illustrated in FIG. 7, the obtaining unit 30 includes the light source 32, the light-receiving element section 33 provided with the light-receiving elements 33r, 33g, and 33b, the amplifier 35, and the A/D converter 36. The obtaining unit 30 causes the light-receiving elements 33r, 33g, and 33b having the spectral sensitivities to RGB to perform photoelectric convert the intensity of the reflected light of the reading light that the light source 32 has applied to an object. Each of the light-receiving elements 33r, 33g, and 33b has, for example, an RGB color filter to ensure the spectral sensitivity to RGB, performs photoelectric conversion of the incident light according to the spectral sensitivity, and outputs an analog RGB signal value corresponding to the intensity of the incident light to the amplifier 35. The amplifier 35 amplifies the analog RGB signals obtained from the light-receiving elements 33r, 33g, and 33b of the light-receiving element section 33 and outputs the amplified signals to the A/D converter 36. The A/D converter 36 performs digital conversion to convert the analog RGB signals input by the amplifier 35 into digital signals, and outputs RGB image data with digital values to the CPU 41.

The CPU 41 associates colorimetric values of patches of a plurality of colors (reference color patches KP: see FIG. 8) stored in advance in a nonvolatile memory (a reference value storing unit) 44 with RGB values obtained by capturing the reference color patches KP by each of the light-receiving elements 33r, 33g, and 33b of the obtaining unit 30, and stores the associated values in a memory table Tb1 (see FIG. 8) in the nonvolatile memory 44. The CPU 41 also stores, in the nonvolatile memory 44, a first linear transformation matrix obtained from the memory table Tb1. The CPU 41 converts a color-measurement-target RGB value obtained by capturing the color measurement adjustment patch CP (see FIG. 9) by the light-receiving elements 33r, 33g, and 33b of the obtaining unit 30 into a first colorimetric value in a color measurement space by using the first linear transformation matrix.

The CPU 41 selects a neighboring point table for selecting a patch of a neighboring point close to the first colorimetric value from among colorimetric values of the patches of the plurality of colors, selects an imaged reference RGB value that forms a pair with the first colorimetric value of the neighboring point, and calculates and stores a second linear transformation matrix for converting the imaged reference RGB value and a reference colorimetric value in the nonvolatile memory 44. The CPU 41 converts the RGB value of the color measurement adjustment patch CP into the colorimetric value by using the reference colorimetric value table, the first linear transformation matrix, the neighboring point table, and the second linear transformation matrix.

Specifically, the image forming apparatus 1 includes a color measuring device that reads a color measuring program for implementing a color measuring method of the first embodiment from a computer-readable recording medium, such as a ROM, an EEPROM (Electrically Erasable and Programmable Read Only Memory), an EPROM, a flash memory, a flexible disk, a CD-ROM (Compact Disc Read Only Memory), a CD-RW (Compact Disc Rewritable), a DVD (Digital Versatile Disk), an SD (Secure Digital) card, or an MO (Magneto-Optical Disc), and loads the color measuring program onto the ROM 42 or the nonvolatile memory 44 to implement the color measuring method for realizing the color reproducibility at low costs, which will be described later. The color measuring program is a computer-executable program written in a legacy programming language or an object-oriented programming language, such as an assembly language, C, C++, C#, or Java (registered trademark), and can be distributed by being stored in the recording medium as described above. Namely, the obtaining unit 30, the CPU 41, and the nonvolatile memory 44 integrally function as the color measuring device.

Operations according to the first embodiment will be explained below. The image forming apparatus 1 according to the first embodiment implements the color measuring method to realize stable color reproducibility at low costs.

Figure 8:
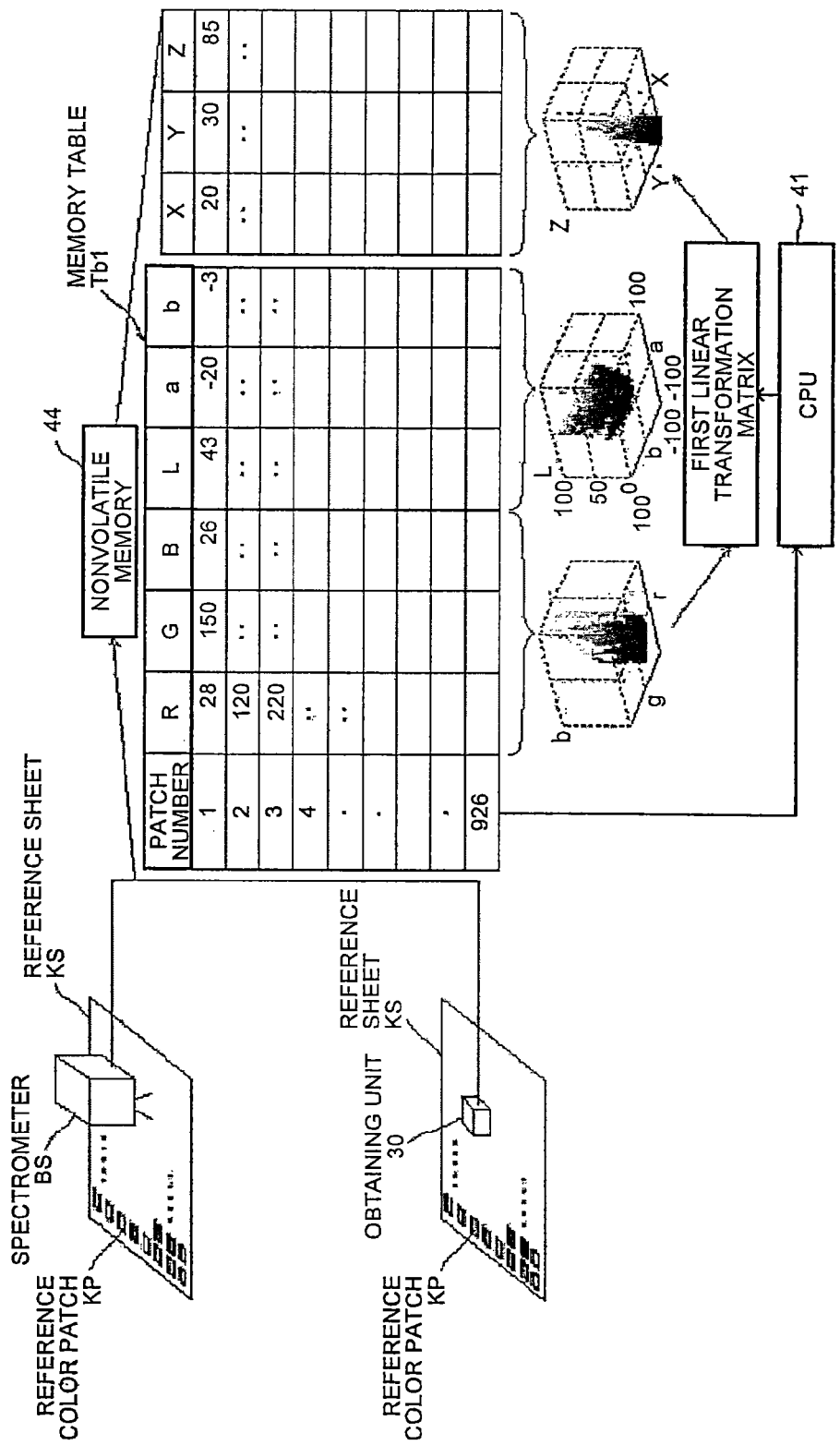
FIG. 8 is a diagram for explaining a process for acquiring a reference colorimetric value and an imaged reference RGB value from a reference sheet and a process for acquiring a first linear transformation matrix.

As illustrated in FIG. 8, the image forming apparatus 1 according to the first embodiment stores at least one of an Lab value and an XYZ value (in FIG. 8, both of the Lab value and the XYZ value), which are colorimetric values of a color measurement result that a spectrometer (the color measuring device) BS has obtained by reading a plurality of the reference color patches KP arrayed on a reference sheet KS, in a memory table Tb1 in the nonvolatile memory 44 in association with patch numbers. Because the Lab value and the XYZ value can be converted from one to the other by using a known conversion equation, if at least one of the Lab value and the XYZ value is stored in the nonvolatile memory 44, the other one of the Lab value and the XYZ value can be obtained. However, if both of the Lab value and the XYZ value are stored in the nonvolatile memory 44, it becomes possible to omit a conversion process, enabling to improve the processing speed. In the following explanation, the Lab values or/and the XYZ values of the reference patches of the reference sheet KS may be referred to as reference colorimetric values.

When the reference colorimetric values are stored in the memory table Tb1 in the nonvolatile memory 44 and the image forming apparatus 1 is in the initial state because of manufacturing or overhaul, the image forming apparatus 1 sets the reference sheet KS on the platen 14 and controls the movement of the carriage 6 so as to cause the obtaining unit 30 to read the same reference color patches KP of the reference sheet KS as those read by the spectrometer BS. After the obtaining unit 30 reads the reference color patches KP of the reference sheet KS, the image forming apparatus 1 stores the imaged reference RGB values that are RGB values obtained by analog-to-digital conversion performed by the A/D converter 36, i.e., device-dependent signals dependent on the device, in the memory table Tb1 in the nonvolatile memory 44 in association with the patch numbers, i.e., in association with the reference colorimetric values as illustrated in FIG. 8.

After the reference colorimetric values and the imaged reference RGB values are stored in the nonvolatile memory 44, the CPU 41 calculates the first linear transformation matrix (the reference-value linear transformation matrix) to covert between the XYZ values being the reference colorimetric values and the imaged reference RGB values, which are stored as pairs in the nonvolatile memory 44, i.e., pairs of the XYZ values and the imaged reference RGB values associated with the same patch numbers, and stores the calculated first linear transformation matrix in the nonvolatile memory 44.

In the image forming apparatus 1, the above processes are performed when the image forming apparatus 1 is in the initial state such that the reference colorimetric values and the imaged reference RGB values, which are execution results, are registered in the memory table Tb1 in the nonvolatile memory 44, and the first linear transformation matrix is calculated and stored in the nonvolatile memory 44.

In this state, the CPU 41 controls movement of the carriage 6 in the main-scanning direction, controls conveyance of the recording medium P by the sheet conveying unit 48, and controls driving of the recording head 20 based on image data or a print setting input from an external apparatus, so that the recording medium P is intermittently conveyed and the recording heads 20y, 20m, 20c, and 20k of the recording head 20 are caused to eject ink to output or record an image onto the recording medium P.

In this state, the ink ejection amount of the recording head 20y, 20m, 20c, or 20k may change over time. If the ink ejection amount changes, an image may be formed in colors different from colors desired by a user, resulting in reduced color reproducibility.

Therefore, the image forming apparatus 1 calculates colorimetric values and performs a color adjustment process to adjust colors based on the colorimetric values at a predetermined color adjustment process timing.

Figure 9:
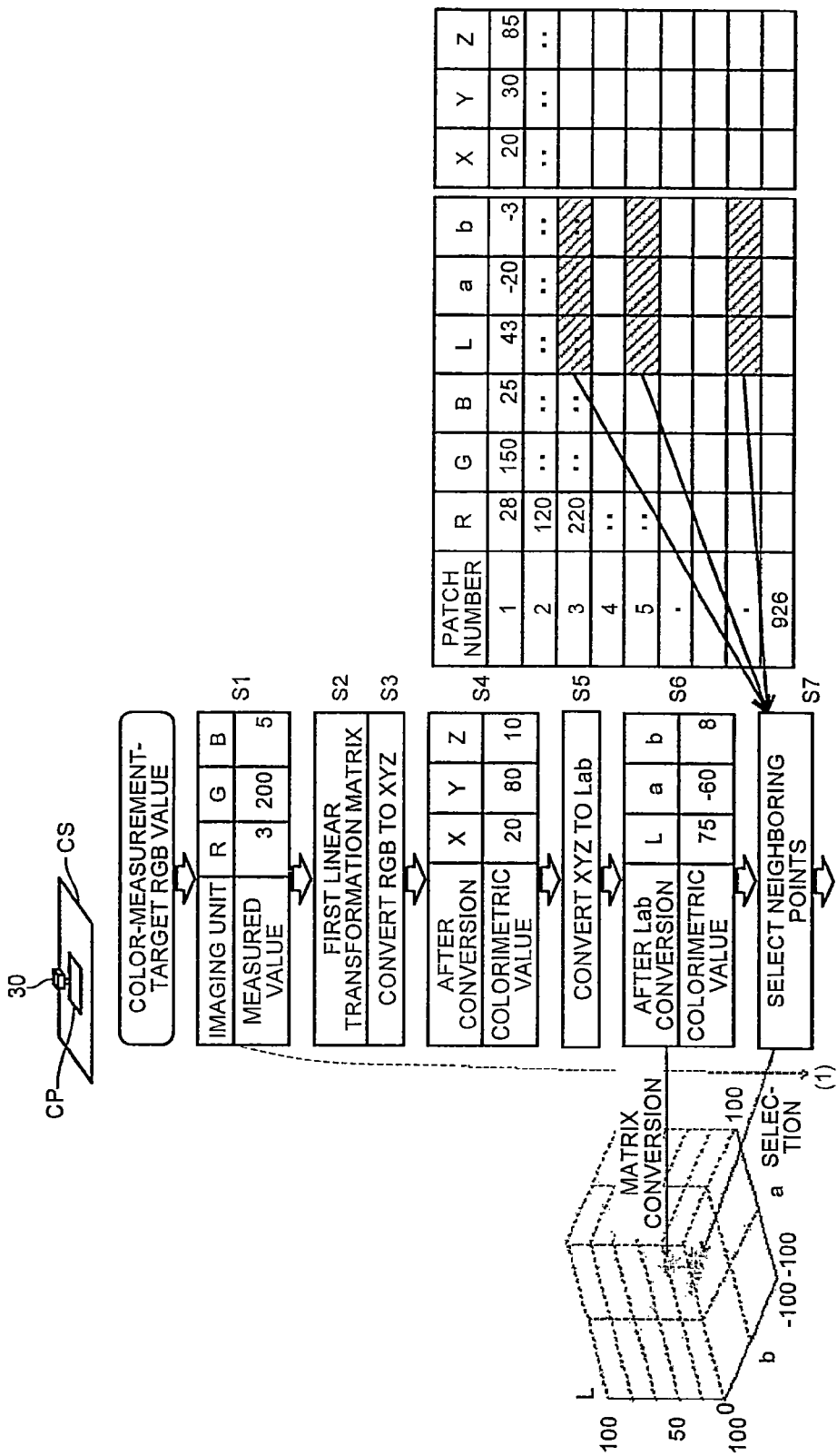
FIG. 9 is a diagram for explaining a color adjustment process.

Specifically, at the color adjustment process timing, the image forming apparatus 1 forms a plurality of the color-measurement color adjustment patches (color measurement objects) CP on the recording medium P by the recording head 20 as illustrated in FIG. 9, and records or outputs them as a color measurement adjustment sheet CS. The color measurement adjustment sheet CS is formed of the color measurement adjustment patches CP that are a plurality of color patches for color measurement adjustment and that are formed by the recording head 20. The color measurement adjustment patches CP are formed so as to reflect the output characteristics of the image forming apparatus 1, in particular, the output characteristics of the recording head 20, at the color adjustment process timing. Pieces of color patch data of the color measurement adjustment patches CP are stored in advance in the nonvolatile memory 44.

As will be described later, the image forming apparatus 1 regards the RGB values of the captured color measurement adjustment patches CP of the color measurement adjustment sheet CS as color-measurement-target RGB values (color-measurement RGB values), and selects reference colorimetric values (neighboring reference colorimetric values) at close distances from colorimetric values converted to the color-measurement-target RGB values from among the reference colorimetric values registered in the memory table Tb1 in the nonvolatile memory 44. The image forming apparatus 1 calculates colorimetric values for converting the color-measurement-target RGB values into the selected neighboring reference colorimetric values, and outputs, by the recording head 20, an image of image data with colors converted based on the colorimetric values. Therefore, the color reproducibility of an image formed by the image forming apparatus 1 can be improved.

Specifically, when the color measurement adjustment sheet CS is set on the platen 14 or when the color measurement adjustment sheet CS is maintained on the platen 14 without being discharged after the color measurement adjustment sheet CS is recorded, the image forming apparatus 1 causes the obtaining unit 30 to capture a plurality of the color measurement adjustment patches CP of the color measurement adjustment sheet CS placed on the platen 14 by controlling movement of the carriage 6. When the obtaining unit 30 captures the color measurement adjustment patches CP of the color measurement adjustment sheet CS, the CPU 41 stores color-measurement-target RGB values being the RGB values obtained by analog-to-digital conversion performed by the A/D converter 36, i.e., device-dependent signals dependent on the device, in the nonvolatile memory 44 as illustrated in FIG. 9 (Step S1). The CPU 41 applies the first linear transformation matrix to the device-dependent signals (Step S2) to convert the device-dependent signals into first XYZ values (Step S3), and stores the first XYZ values in the nonvolatile memory 44 (Step S4). For example, in FIG. 9, the CPU 41 converts the color-measurement-target RGB value (3, 200, 5) obtained by the obtaining unit 30 into the first XYZ value (20, 80, 10) (the first colorimetric value) and stores it in the nonvolatile memory 44.

The CPU 41 converts the first XYZ values into first Lab values (the first colorimetric values) by referring to the memory table Tb1 in the nonvolatile memory 44 or by using a known conversion equation (Step S5), and stores the first Lab values in the nonvolatile memory 44 (Step S6). For example, in FIG. 9, the CPU 41 converts the first XYZ value (20, 80, 10) into the first Lab value (75, −60, 8) being an imaged colorimetric value.

As illustrated in the Lab space in FIG. 9, the CPU 41 searches through the reference colorimetric values (the Lab values) of the color patches of a plurality of colors in the memory table Tb1 stored in the nonvolatile memory 44, and selects only a set of a predetermined number of color patches (neighboring color patches) with reference colorimetric values (the Lab values) at close distances from a certain first Lab value in the Lab space from among the reference colorimetric values (the Lab values) (Step S7). For example, sixty color patches are selected and plotted on the Lab space illustrated in FIG. 9. The number (the predetermined number) of the color patches to be selected is not limited to sixty. As a method to select patches at the close distances, for example, a method may be applied in which distances between the first Lab value and the reference colorimetric values (the Lab values) of the color patches at all of the points are calculated, and reference Lab values (in FIG. 9, the reference Lab values indicated by hatching) of the color patches at close distances from the first Lab value being the first colorimetric value are selected.

Figure 10:
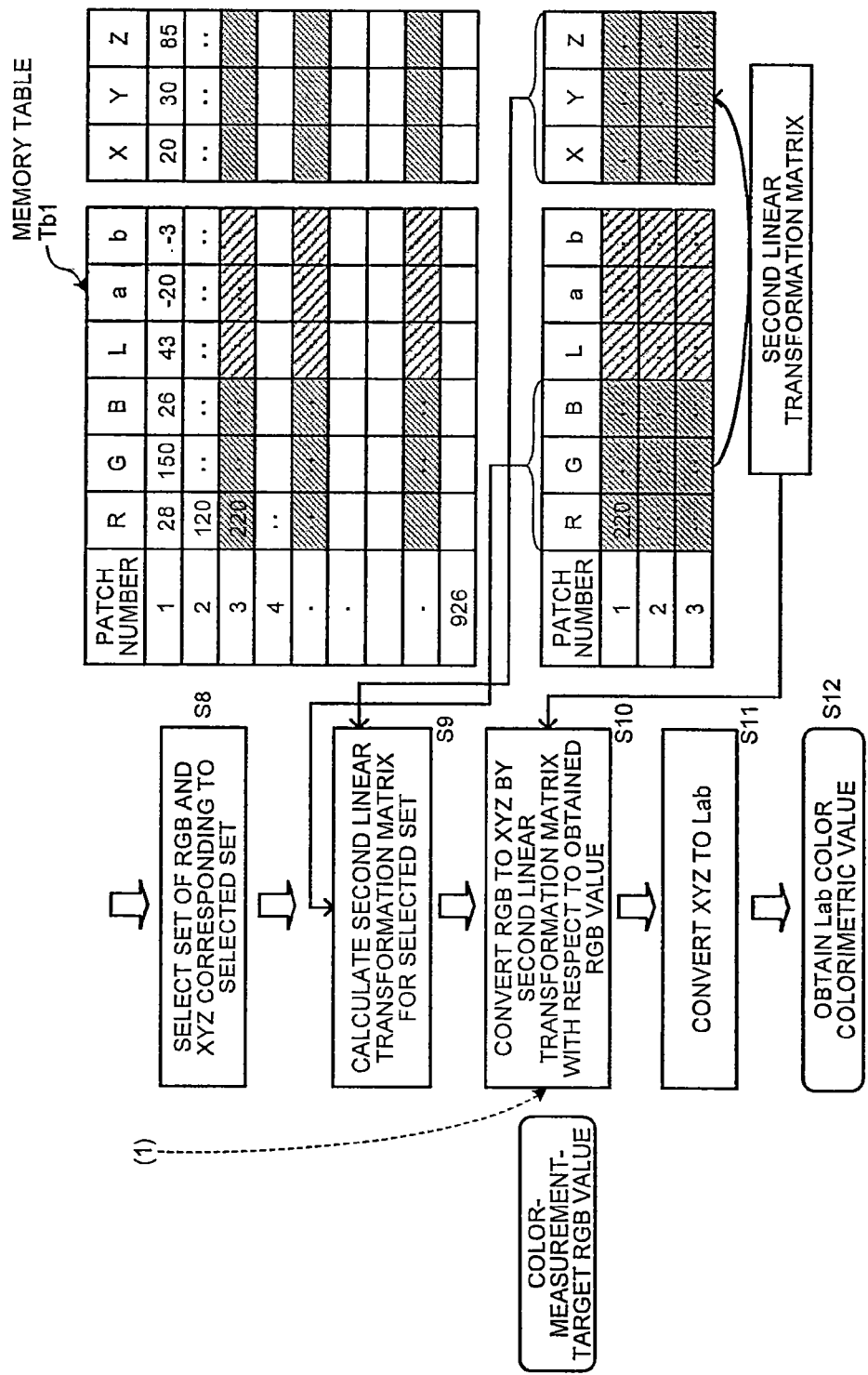
FIG. 10 is a diagram illustrating the color adjustment process continued from the process illustrated in FIG. 9.

As illustrated in FIG. 10, the CPU 41 refers to the memory table Tb1 to select imaged reference RGB values that form pairs with the first Lab values of the selected set, i.e., sets of the imaged reference RGB values (the selected RGB values) and the reference XYZ values having the same patch numbers as that of the first Lab values of the selected set (Step S8). The CPU 41 calculates the second linear transformation matrix for converting between the imaged reference RGB values and the reference XYZ values of the selected set (selected set) in units of sets by using a least squares method, and stores the calculated second linear transformation matrix in the nonvolatile memory 44 (Step S9).

The CPU 41 obtains second XYZ values being second colorimetric values by applying the second linear transformation matrix to the color-measurement-target RGB values of the color measurement adjustment patches CP of the color measurement adjustment sheet CS, which are captured as color measurement objects by the obtaining unit 30 and subjected to analog-to-digital conversion by the A/D converter 36 (Step S10). The CPU 41 then converts the second XYZ values into second Lab values by using a known conversion equation (Step S11), to thereby obtain final colorimetric values (Step S12).

The CPU 41 adjusts an image based on the image data subjected to color conversion using the obtained colorimetric values, and forms an image based on image data of the adjusted image by driving the recording head 20.

Specifically, the image forming apparatus 1 according to the first embodiment applies the first linear transformation matrix to the color-measurement-target RGB values, which are obtained by capturing a plurality of the color measurement adjustment patches CP of the color measurement adjustment sheet CS reflecting the output characteristics of the recording head 20 at the color adjustment process timing, to thereby obtain the first Lab values that are values obtained upon capturing the reference sheet KS in the initial state. The image forming apparatus 1 then selects sets of patches and reference Lab values at close distances from the first Lab values in the Lab space from among the reference Lab values of a plurality of the color patches registered in the memory table Tb1, and converts the color-measurement-target RGB values corresponding to the selected reference Lab values into Lab values by using the second linear transformation matrix, to thereby obtain Lab colorimetric values. The CPU 41 adjusts an image based on the image data subjected to the color conversion using the obtained colorimetric values, and forms an image based on the image data of the adjusted image by driving the recording head 20.

In this way, the image forming apparatus 1 according to the first embodiment includes a color measuring unit that includes: the obtaining unit (imaging unit) 30 that captures a subject being a color measurement object to obtain an RGB value of the subject; the nonvolatile memory (the reference value storing unit) 44 for storing a reference colorimetric value that is a device-independent colorimetric value of each of colors of the reference color patches KP in a predetermined color space, and an imaged reference RGB value that is an RGB value of each of the colors of the reference color patches KP captured by the obtaining unit 30, in an associated manner; the CPU (the reference-value linear transformation matrix calculating unit) 41 that calculates the first linear transformation matrix (the reference-value linear transformation matrix) for converting the imaged reference RGB values into the reference colorimetric values; the CPU (the imaged colorimetric value calculating unit) 41 that calculates first colorimetric values (imaged colorimetric values) by converting the color-measurement-target RGB values (the color-measurement RGB values) of the color measurement adjustment patches CP of the color measurement adjustment sheet CS captured as a predetermined color measurement object by the obtaining unit 30 into colorimetric values by using the first linear transformation matrix; the CPU (the patch selecting unit) 41 that selects a predetermined number of the reference color patches KP at close distances from the first colorimetric values from among the reference color patches KP; the CPU (the RGB selecting unit) 41 that selects, as selection RGB values, color-measurement RGB values corresponding to the predetermined number of the selected reference color patches; the CPU (the selection-RGB-value linear transformation matrix calculating unit) 41 that calculates the second linear transformation matrix (the selection-RGB-value linear transformation matrix) for converting the selection RGB values into the reference colorimetric values; and the CPU (the colorimetric value converting unit) 41 that converts the RGB values of the color measurement adjustment patches CP obtained by the obtaining unit 30 into the colorimetric values by using the second linear transformation matrix.

Therefore, colorimetric values can be obtained by extracting a section having the linearity from among the color measurement adjustment patches CP and performing linear transformation on the extracted section. Consequently, it becomes possible to realize stable color reproduction with reduced distortion at low costs without an expensive spectrometer.

Furthermore, in the image forming apparatus 1 according to the first embodiment, the color measuring unit performs a color measuring method that includes: an imaging step for capturing a subject being a color measurement object to obtain an RGB value of the subject; a reference value storing step for storing, in the nonvolatile memory (the reference value storing unit) 44, a reference colorimetric value that is a device-independent colorimetric value of each of colors of the reference color patches KP in a predetermined color space, and an imaged reference RGB value that is an RGB value of each of the colors of the reference color patches KP captured at the imaging step, in an associated manner; a reference-value linear transformation matrix calculating step for calculating the first linear transformation matrix (the reference-value linear transformation matrix) for converting the imaged reference RGB values into the reference colorimetric values; an imaged colorimetric value calculating step for calculating first colorimetric values (imaged colorimetric values) by converting the color-measurement-target RGB values (the color-measurement RGB values) of the color measurement adjustment patches CP of the color measurement adjustment sheet CS captured as a predetermined color measurement object at the imaging step into colorimetric values by using the first linear transformation matrix; a patch selecting step for selecting a predetermined number of the reference color patches KP at close distances from the first colorimetric values from among the reference color patches; an RGB selecting step for selecting, as selection RGB values, color-measurement-target RGB values corresponding to the predetermined number of the selected reference color patches KP; a selection-RGB-value linear transformation matrix calculating step for calculating the second linear transformation matrix (the selection-RGB-value linear transformation matrix) for converting the selection RGB values into the reference colorimetric values; and a colorimetric value converting step for converting the RGB values of the color measurement adjustment patches CP obtained at the imaging step into the colorimetric values by using the second linear transformation matrix.

Therefore, colorimetric values can be obtained by extracting a section having the linearity from among the color measurement adjustment patches CP and performing linear transformation on the extracted section. Consequently, it becomes possible to realize stable color reproduction with reduced distortion at low costs without an expensive spectrometer.

Moreover, the image forming apparatus 1 according to the first embodiment includes a color measuring program that causes a computer to execute: an imaging process for capturing a subject being a color measurement object to obtain an RGB value of the subject; a reference value storing process for storing, in the nonvolatile memory (the reference value storing unit) 44, a reference colorimetric value that is a device-independent colorimetric value of each of colors of the reference color patches KP in a predetermined color space, and an imaged reference RGB value that is an RGB value of each of the colors of the reference color patches KP captured in the imaging process, in an associated manner; a reference-value linear transformation matrix calculation process for calculating the first linear transformation matrix (the reference-value linear transformation matrix) for converting the imaged reference RGB values into the reference colorimetric values; an imaged colorimetric value calculation process for calculating first colorimetric values (imaged colorimetric values) by converting the color-measurement-target RGB values (the color-measurement RGB values) of the color measurement adjustment patches CP of the color measurement adjustment sheet CS captured as a predetermined color measurement object in the imaging process into the colorimetric values by using the first linear transformation matrix; a patch selection process for selecting a predetermined number of the reference color patches KP at close distances from the first colorimetric values from among the reference color patches; an RGB selection process for selecting, as selection RGB values, color-measurement-target RGB values corresponding to the predetermined number of the selected reference color patches KP; a selection-RGB-value linear transformation matrix calculation step for calculating the second linear transformation matrix (the selection-RGB-value linear transformation matrix) for converting the selection RGB values into the reference colorimetric values; and a colorimetric value conversion process for converting the RGB values of the color measurement adjustment patches CP obtained in the imaging process into the colorimetric values by using the second linear transformation matrix.

Therefore, colorimetric values can be obtained by extracting a section having the linearity from among the color measurement adjustment patches CP and performing linear transformation on the extracted section. Consequently, it becomes possible to realize stable color reproduction with reduced distortion at low costs without an expensive spectrometer.

Second Embodiment

FIG. 11 to FIG. 25 are diagrams illustrating a color measuring device, an image forming apparatus, a color measuring method, and a color measuring system according to a second embodiment of the present invention. Specifically, FIG. 11 is a plan view of an imaging unit 100 of an image forming apparatus to which the color measuring device, the image forming apparatus, the color measuring method, and the color measuring system according to the second embodiment of the present invention are applied.

The second embodiment is applied to an image forming apparatus 1-2 that is the same as the image forming apparatus 1 of the first embodiment illustrated in FIG. 1. In the explanation of the second embodiment, although not illustrated in the drawings, the same components as those illustrated in FIG. 1 are appropriately denoted by the same reference numerals as those of the first embodiment.

Figure 11:
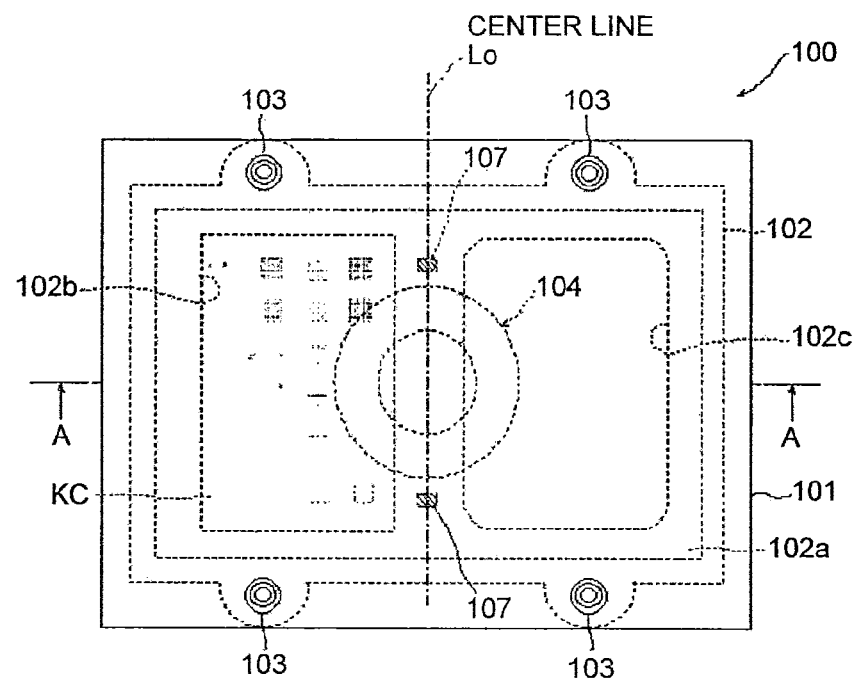
FIG. 11 is a top view of an imaging unit according to a second embodiment.
Figure 12:
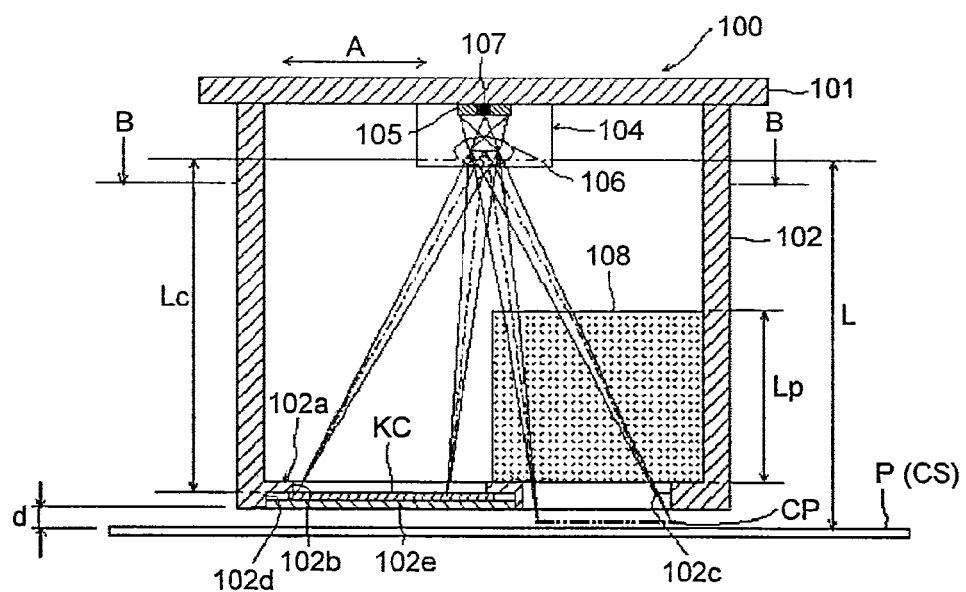
FIG. 12 is a cross-sectional view of the imaging unit viewed in the direction of arrow A-A in FIG. 11.
Figure 13:
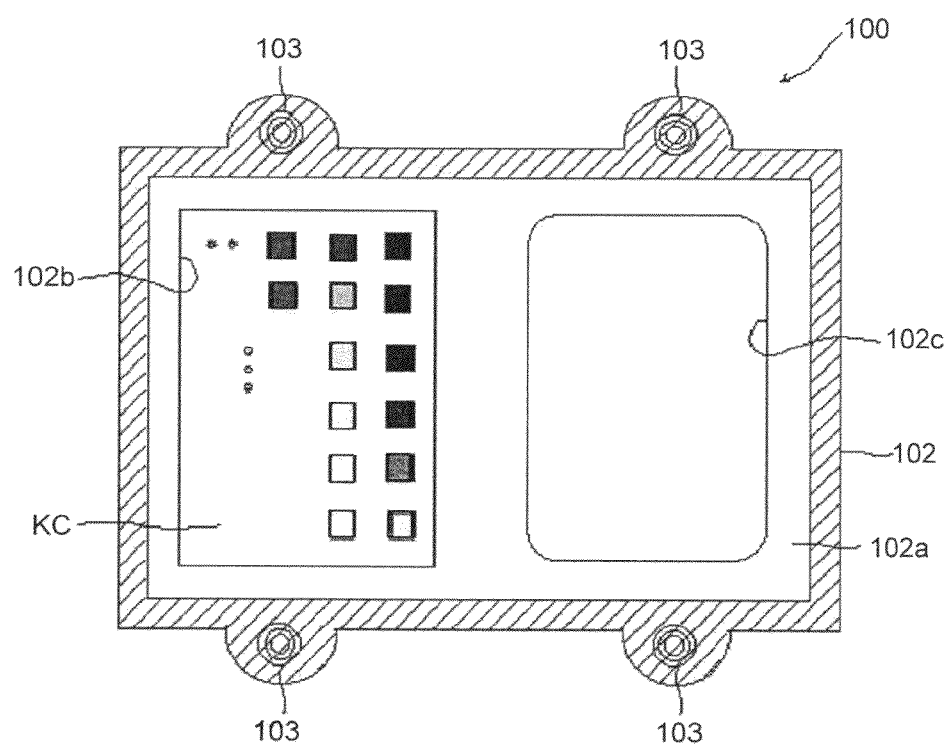
FIG. 13 is a cross-sectional view of the imaging unit viewed in the direction of arrow B-B in FIG. 12.

In the image forming apparatus 1-2, as illustrated in FIG. 11, FIG. 12 that is a cross-sectional view viewed in the direction of arrow A-A in FIG. 11, and FIG. 13 that is a cross-sectional view viewed in the direction of arrow B-B in FIG. 12, the imaging unit (or the obtaining unit) 100 is formed such that a frame 102 in the form of a quadrangular box with a surface on a substrate 101 side open is fixed to the substrate 101 by fasteners 103. The substrate 101 is fixed to the carriage 6 illustrated in FIG. 1.

The imaging unit 100 includes an image sensor section 104 in the center of the surface of the substrate 101 on the frame 102 side. The image sensor section 104 includes a two-dimensional image sensor 105, such as a CCD (Charge Coupled Device) sensor or a CMOS (Complementary Metal Oxide Semiconductor) sensor, and a lens 106. The imaging unit 100 includes a pair of illumination light sources 107 that are arranged on the substrate 101 so as to be on the center line Lo passing the center of the image sensor section 104 in the sub-scanning direction and be equally separated by a predetermined amount from the center of the image sensor section 104 in the sub-scanning direction. As the illumination light sources 107, LEDs or the like are used. Similarly to the light source 32, an organic EL for example may be used as the illumination light sources 107.

The imaging unit 100 is mounted on the carriage 6 such that a lower side of a surface (hereinafter, described as a bottom surface) 102a of the frame 102 opposite the substrate 101 faces the recording medium P on the platen 14 with a predetermined gap d interposed between the bottom surface and the recording medium P. Approximately rectangular openings 102b and 102c are formed on the bottom surface 102a with the center line Lo interposed therebetween in the main-scanning direction. It is preferable to make the gap d smaller by taking a focal length to the two-dimensional image sensor 105 into account as will be described later. For example, by taking the relation of the flatness of the recording medium P into account, the gap d is set to about 1 mm to 2 mm so as to prevent the bottom surface of the frame 102 and the recording medium P from contacting each other.

A recess 102d with a predetermined width is formed on the surface of the opening 102b on the recording medium P side along the periphery of the opening 102b. A reference chart KC is removably set in the recess 102d. A holder plate 102e that holds the reference chart KC in the recess 102d is detachably attached to the recess 102d of the opening 102b of the frame 102 so as to cover the surface of the reference chart KC on the recording medium P side. Therefore, the opening 102b is closed by the reference chart KC and the holder plate 102e. The surface of the holder plate 102e on the recording medium P side is a smooth flat surface.

The opening 102c is used to capture the reference color patches KP of the reference sheet KS and the color measurement adjustment patches CP of the color measurement adjustment sheet CS, which are imaging objects (objects) formed on the recording medium P. It is sufficient that the opening 102c has a size with which at least the whole image of an imaging object can be captured. However, because the gap d is provided between the frame 102 and the imaging object, the opening 102c is set to be slightly greater than the size of the imaging area of an imaging object by taking a shadow that appears around the opening 102c into account.

The reference chart KC is captured by the imaging unit 100 as an object to be compared with the reference color patches KP of the reference sheet KS and with the imaged colorimetric values of the color measurement adjustment patches CP of the color measurement adjustment sheet CS that is an imaging object in the color adjustment process, together with the reference color patches KP and the color measurement adjustment patches CP. Specifically, the imaging unit 100 captures, as objects to be compared, color patches of the reference chart KC attached to the recess 102d formed around the opening 102b of the bottom surface 102a of the frame 102, together with the reference color patches KP of the reference sheet KS and the color measurement adjustment patches CP of the color measurement adjustment sheet CS provided outside the frame 102, via the opening 102c formed on the bottom surface 102a of the frame 102. The two-dimensional image sensor 105 reads images by sequentially scanning pixels. Therefore, the imaging unit 100 sequentially reads the reference color patches KP of the reference sheet KS, the color measurement adjustment patches CP of the color measurement adjustment sheet CS, and the reference chart KC. In this case, the imaging unit 100 captures images of the reference color patches KP, the color measurement adjustment patches CP, and the reference chart KC in one frame.

Figure 14:
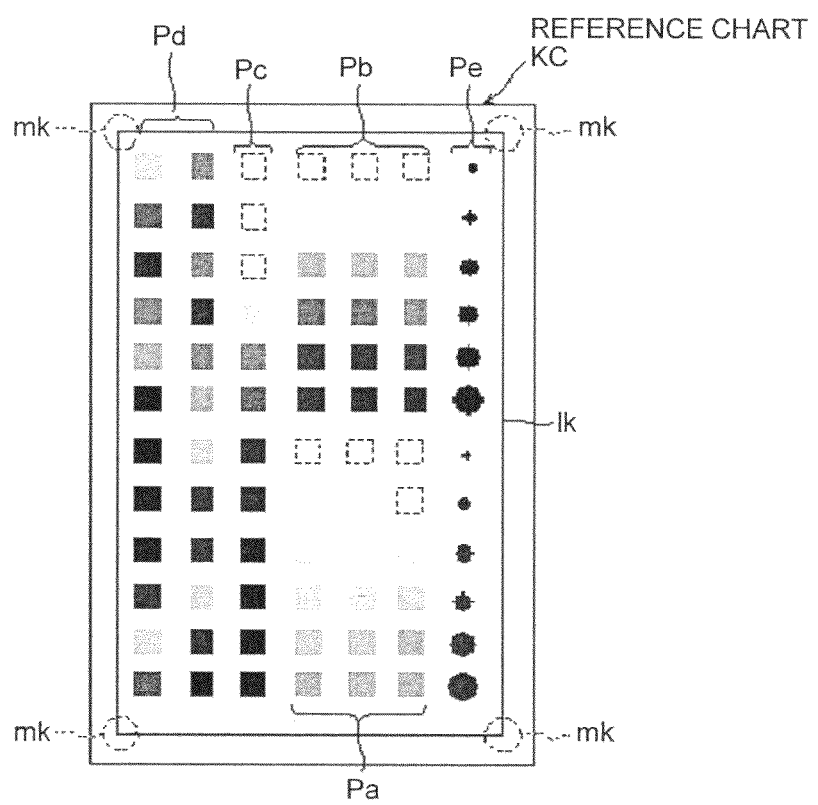
FIG. 14 is a plan view of a reference chart.

As illustrated in FIG. 14, similarly to the reference sheet KS as described above, the reference chart KC contains a plurality of color-measurement reference color patch arrays Pa to Pd, a dot diameter measurement pattern array Pe, a distance measurement line lk, and a chart position specification marker mk, all of which are arranged on a surface (top surface) inside the frame 102.

The color-measurement reference color patch arrays Pa to Pd include a patch array Pa in which color patches of primary colors of YMC are arranged in order of scale, a patch array Pb in which color patches for secondary colors of RGB are arranged in order of scale, a patch array (monochrome tone pattern) Pc in which gray scale patches are arranged in order of scale, and a patch array Pd in which patches for tertiary colors are arranged. The dot diameter measurement pattern array Pe is a pattern array for measuring geometric configurations, in which circular patterns with different sizes are arranged in order of size.

The distance measurement line lk is formed as a rectangular frame line surrounding the color-measurement reference color patch arrays Pa to Pd and the dot diameter measurement pattern array Pe. The chart position specification markers mk are arranged at four corners of the distance measurement line lk to specify the position of each of the patches.

A color measurement control unit 120 (see FIG. 16), which will be described later, specifies the distance measurement line lk and the chart position specification markers mk at the four corners in the image data of the reference chart KC obtained from the imaging unit 100, to thereby specify the positions of the reference chart KC and each of the patterns.

For each of the patches of the color-measurement reference color patch arrays Pa to Pd, similarly to FIG. 8, color values (Lab values) in the Lab color space that is a standard color space are measured in advance by using the spectrometer BS. The color values are used as reference values when colors of the color measurement adjustment patches CP of the color measurement adjustment sheet CS are measured. The configuration of the color-measurement reference color patch arrays Pa to Pd arranged in the reference chart KC are not limited to the arrangement example illustrated in FIG. 14, and an arbitrary patch array may be used. For example, it may be possible to use a patch array that can specify a color range as wide as possible. For another example, the patch array Pa for the primary colors of YMCK or the patch array PC for the gray scale may be formed with patches having colorimetric values of the ink used by the image forming apparatus 1-2. For still another example, the patch array Pb for the secondary colors of RGB of the reference chart KC may be formed with patches having colorimetric values that can be produced by the ink used by the image forming apparatus 1-2. For still another example, it may be possible to use a standard color chart for which colorimetric values are defined based on Japan Color or the like.

In the second embodiment, the reference chart containing reference patch arrays in the form of a popular patch (color patch) is used. However, the reference chart does not necessarily have to contain the reference patch arrays as described above. It is sufficient that the reference chart contains a plurality of colors that can be used for color measurement and the colors are arranged such that their positions can be specified.

The reference chart KC is arranged in the recess 102d formed on the outer periphery of the surface of the opening 102b on the recording medium P side on the bottom surface 102a of the frame 102. Therefore, the two-dimensional image sensor 105 of the image sensor section 104 can capture the reference chart KC at the same focal length as that of the imaging object, such as the recording medium P.

The reference chart KC is removably set in the recess 102d formed on the outer periphery of the surface of the opening 102b on the recording medium P side on the bottom surface 102a of the frame 102, and the surface on the recording medium P side is removably held by the holder plate 102e that is detachably attached to the recess 102d. Therefore, even when a waste that has entered the frame 102 adheres to the surface of the reference chart KC, it is possible to detach the holder plate 102e and the reference chart KC, clean the reference chart KC, and then attach the holder plate 102e and the reference chart KC again. Therefore, the measurement accuracy of the reference chart KC can be improved.

In the imaging unit 100, an optical path length changing member 108 is provided on the optical path between the recording medium P and the two-dimensional image sensor 105 via the opening 102c so as to close the opening 102c. The optical path length changing member 108 is a transmissive member with a refractive index n (n is an arbitrary value). The optical path length changing member 108 has, as illustrated in FIG. 12, the outer shape greater than the opening 102c and is disposed inside the frame 102. The fixed position of the optical path length changing member 108 is not limited to the position of the opening 102c inside the frame 102 as illustrated in FIG. 12. For example, the optical path length changing member 108 may be disposed at the position of the frame 102 on the imaging surface side or at a position separated from the opening 102c inside the frame 102, as long as the optical path length changing member 108 is located on the optical path between the opening 102c and the two-dimensional image sensor 105. When light passes through the optical path length changing member 108 with the refractive index n, the optical path length of the light extends according to the refractive index n of the optical path length changing member 108, so that the light is incident on the two-dimensional image sensor 105 and an image is seen as if it floats. The floating amount C of the image is obtained by Equation (1) below:

$$C = Lp(1 - 1/n) \qquad (1)$$

where Lp is the length of the optical path length changing member 108.

A focal length L to the focal plane of the imaging unit 100 other than the reference chart KC, that is, the focal length L to the surface of the recording medium P to be captured via the optical path length changing member 108 and the opening 102c is obtained by Equation (2) below:

$$L = Lc + Lp(1 - 1/n) \qquad (2)$$

where Lc is a distance between a top of the lens 106 on the imaging object side and the reference chart KC, and n is the refractive index of the optical path length changing member 108.

Therefore, if, for example, the refractive index n of the optical path length changing member 108 is set to 1.5, L=Lc+Lp(1−1/1.5)=Lc+Lp(⅓), so that the optical path length can be extended by about one-third of the length Lp of the optical path length changing member 108. If Lp=9 (mm), L=Lc+3 (mm), so that the focal position of the reference chart KC matches the focal position on the imaging surface of the recording medium P. Therefore, a conjugate relation can be established between the reference chart KC and the imaging surface of the recording medium P.

The illumination light for illuminating the reference chart KC and the illumination light for illuminating the imaging surface of the recording medium P via the optical path length changing member 108 and the opening 102*c* are applied by the same illumination light sources 107. Therefore, the imaging unit 100 can capture the reference chart KC and the imaging surface of the recording medium P under the same illumination condition. The illumination light sources 107 are disposed at two positions on the center line Lo located at an approximately intermediate position between the reference chart KC and the recording medium P so as to be symmetric with respect to the lens 106 in the center line Lo. Therefore, it is possible to uniformly illuminate the reference chart KC and the imaging area of the recording medium P under approximately the same condition.

In the imaging unit 100, the opening 102*c* and the reference chart KC are arranged in the imaging area so as to be approximately symmetric with respect to the center line Lo connecting the center of the lens 106 and the illumination light sources 107. Therefore, it is possible to set the same imaging condition of the two-dimensional image sensor 105 in a line symmetric manner. As a result, it is possible to improve the accuracy of the color adjustment process or the color measurement process performed by the two-dimensional image sensor 105 using the reference chart KC.

Figure 15:
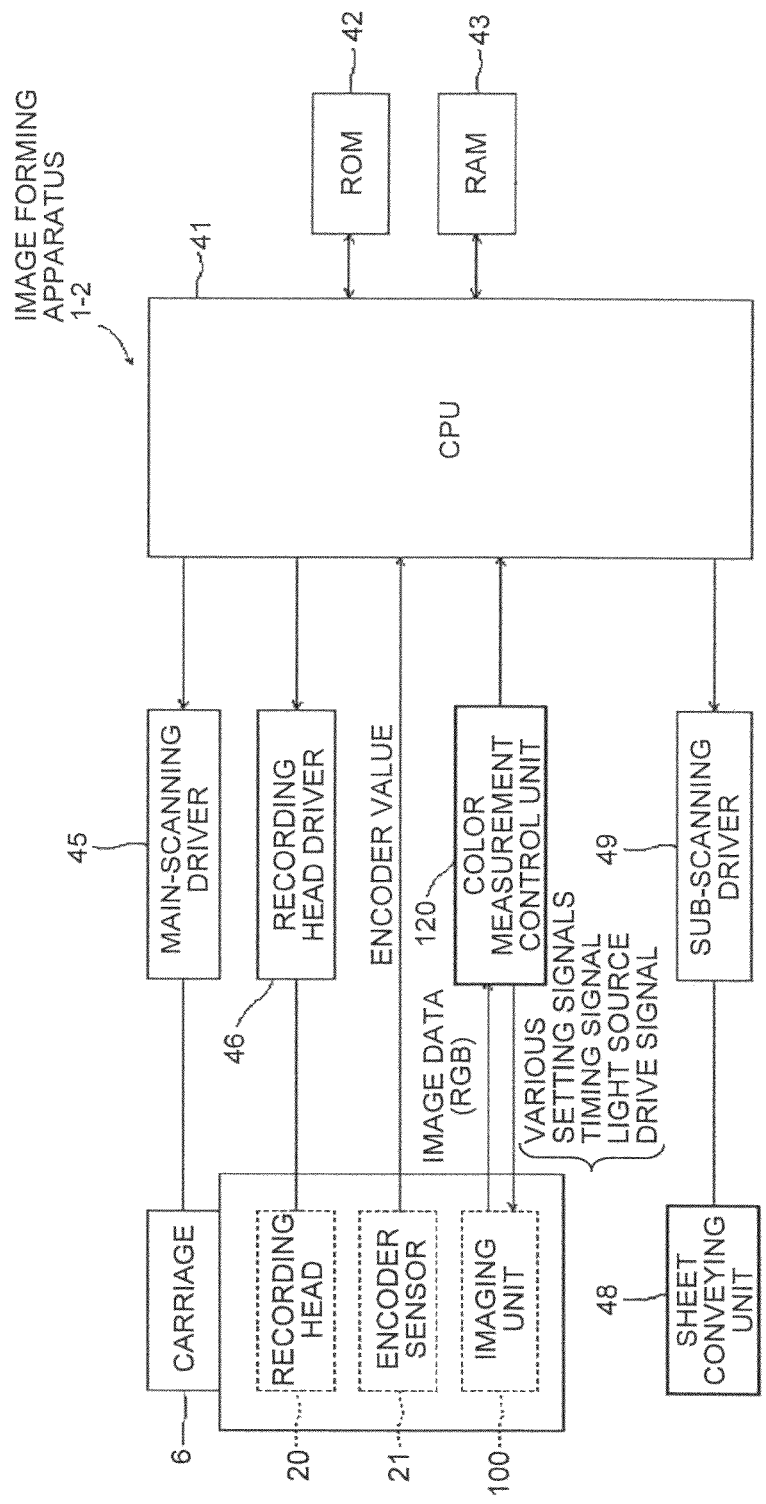
FIG. 15 is a block diagram illustrating a configuration of main parts of an image forming apparatus according to the second embodiment.

The image forming apparatus 1-2 according to the second embodiment is configured as illustrated in a block diagram in FIG. 15, in particular, the configuration is different from the configuration of the image forming apparatus 1 of the first embodiment in terms of the imaging unit 100 and the color measurement control unit 120. Therefore, the same components as those of the first embodiment illustrated in FIG. 6 are denoted by the same reference numerals in FIG. 15, and explanation thereof will be simplified or omitted below.

As illustrated in FIG. 15, the image forming apparatus 1-2 according to the second embodiment includes, similarly to the image forming apparatus 1 of the first embodiment, the CPU 41, the ROM 42, the RAM 43, the nonvolatile memory 44, the main-scanning driver 45, the recording head driver 46, the LED driver 47, the sheet conveying unit 48, the sub-scanning driver 49, the recording head 20 and the encoder sensor 21 mounted on the carriage 6. The image forming apparatus 1 also includes the imaging unit 100 mounted on the carriage 6 and the color measurement control unit 120.

In the first embodiment, the CPU 41 performs the color adjustment process involving the color measurement process. In the second embodiment, the color measurement control unit 120 performs the color measurement process and the CPU 41 performs the color adjustment process on the image data by using colorimetric values obtained by the color measurement process and controls the recording head 20 based on the image data subjected to the color adjustment process in order to form an image with improved color reproducibility.

Specifically, in the color adjustment process, the imaging unit 100 causes the image sensor section 104 to capture the color measurement adjustment patches CP, which are formed on the recording medium P by the recording head 20 that may have changed over time, and the reference chart KC arranged inside the frame 102, and outputs the image data obtained from the captured color measurement adjustment patches CP and the captured reference chart KC to the color measurement control unit 120 as described above. Similarly to the first embodiment, the color measurement control unit 120 converts the measurement values of the color measurement adjustment patches CP, which are captured by the image sensor section 104 in the color adjustment process and obtained from the imaging unit 100, into the initial reference colorimetric values (at least one of the initial reference Lab value and the initial reference XYZ value), which are initial reference colorimetric values of the patches Pa to Pe of the reference chart KC that are read and stored when the imaging unit 100 reads the reference color patches (hereinafter, described as initial reference color patches) of the reference sheet KS. Subsequently, the color measurement control unit 120 performs the same color measurement adjustment process as the color measurement adjustment process of the first embodiment. Therefore, the imaging unit 100 and the color measurement control unit 120 integrally function as the color measuring device. In the second embodiment, the color measurement control unit 120 and the imaging unit 100 are separated from each other; however, the color measurement control unit 120 and the imaging unit 100 may be integrated with each other. For example, it may be possible to mount a control circuit that functions as the color measurement control unit on the substrate 101 of the imaging unit 100.

Figure 16:
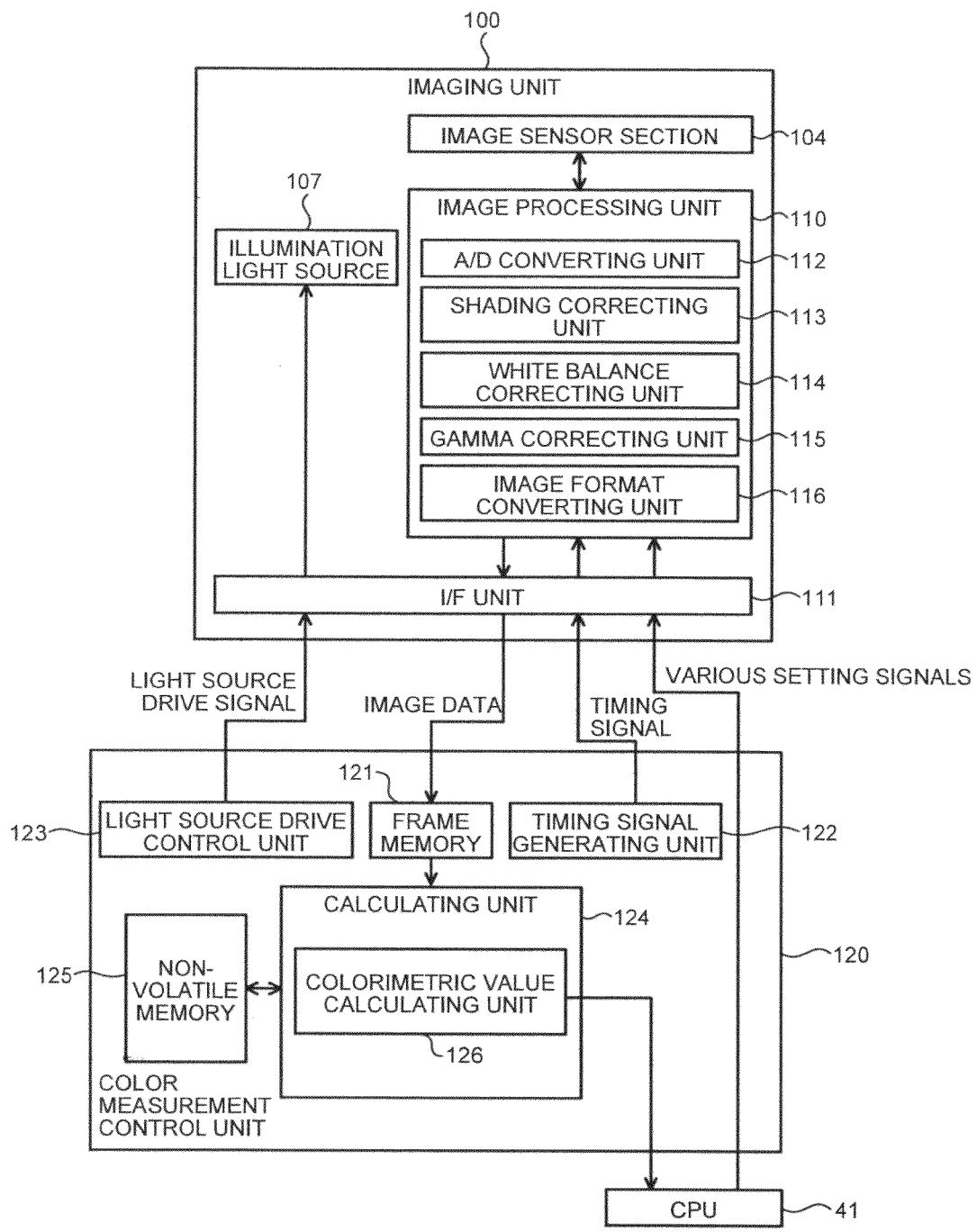
FIG. 16 is a block diagram illustrating configurations of the imaging unit and a color measurement control unit.

The imaging unit 100 and the color measurement control unit 120 are configured as illustrated in a block diagram in FIG. 16. The imaging unit 100 includes the image sensor section 104 and the illumination light sources 107, and also includes an image processing unit 110 and an I/F unit 111 mounted on the substrate 101. In the second embodiment, the image processing unit 110 and the image sensor section 104 are separated from each other. However, it may be possible to provide the functions of the image processing unit 110 to the two-dimensional image sensor 105 of the image sensor section 104. The image processing unit 110 includes an A/D converting unit 112, a shading correcting unit 113, a white balance correcting unit 114, a gamma correcting unit 115, and an image format converting unit 116.

The image processing unit 110 performs necessary image processing on analog RGB image data that is captured and output by the image sensor section 104, and outputs the processed image data to the color measurement control unit 120.

The A/D converting unit 112 converts the analog RGB signal input by the image sensor section 104 into a digital signal, and outputs the digital signal to the shading correcting unit 113.

The shading correcting unit 113 corrects an error in the image data, in particular, in the RGB image data input by the A/D converting unit 112, due to non-uniform illuminance of the illumination light that the illumination light sources 107 have applied to the imaging range of the image sensor section 104, and outputs the corrected image data to the white balance correcting unit 114.

The white balance correcting unit 114 corrects the white balance of the RGB image data that has been subjected to the shading correction, and outputs the corrected image data to the gamma correcting unit 115.

The gamma correcting unit 115 corrects the image data input by the white balance correcting unit 114 so as to compensate for the linearity of the sensitivity of the image sensor section 104, and outputs the corrected image data to the image format converting unit 116.

The image format converting unit 116 converts the image data subjected to the gamma correction into an arbitrary format, and outputs the image data in the converted format to the color measurement control unit 120 via the I/F unit 111.

The I/F unit 111 is an interface that allows the imaging unit 100 to acquire various setting signals, a timing signal, and a light source drive signal sent by the color measurement control unit 120, and allows the imaging unit 100 to send image data to the color measurement control unit 120.

The color measurement control unit 120 includes a frame memory 121, a timing signal generating unit 122, a light source drive control unit 123, a calculating unit 124, and a nonvolatile memory 125. The calculating unit 124 includes a colorimetric value calculating unit 126.

The frame memory 121 is a memory for temporarily storing image data sent by the imaging unit 100 and for outputting the stored image data to the calculating unit 124.

Similarly to the nonvolatile memory 44 of the first embodiment as illustrated in FIG. 8, the nonvolatile memory (a reference value storing unit and a color-measured RGB value storing unit) 125 stores therein, as the reference colorimetric values, at least one of the Lab value and the XYZ value (in FIG. 8, both of the Lab value and the XYZ value), which are colorimetric values of a color measurement result that the spectrometer (the color measuring device) BS has read from a plurality of the reference color patches KP arrayed on the reference sheet KS, in the memory table Tb1 in the nonvolatile memory 125 in association with the patch numbers.

Furthermore, when the reference colorimetric values are stored in the memory table Tb1 in the nonvolatile memory 125 and the image forming apparatus 1-2 is in the initial state, the image forming apparatus 1-2 sets the reference sheet KS on the platen 14 of the image forming apparatus 1-2, controls the movement of the carriage 6, and stores imaged reference RGB values that the imaging unit 100 has obtained by reading the same reference color patches KP of the reference sheet KS as those read by the spectrometer BS in the memory table T1 in the nonvolatile memory 125 in association with the patch numbers, i.e., in association with the reference colorimetric values. Furthermore, the image forming apparatus 1-2 acquires RGB values by capturing the patches of the reference chart KC of the imaging unit 100 and stores the RGB values, as initial reference RGB values RdGdBd, in the memory table T1 in the nonvolatile memory 125 under the control of the calculating unit 124.

In actuality, the initial reference RGB values RdGdBd are RGB values of the respective patches of the reference chart KC that is captured when the imaging unit 100 captures the reference color patches KP of the reference sheet KS. Incidentally, the number of the reference color patches KP of the reference sheet KS is large, for example, a few hundreds, and the reference color patches KP are captured one by one. Therefore, the reference chart KC is also captured every time each of the reference color patches KP is captured. Consequently, a large number of pieces of imaged data of the reference chart KC are generated.

Therefore, in the image forming apparatus 1-2 according to the second embodiment, the color measurement control unit 120 obtains an average of the RGB values of all of the patches of the reference chart KC captured by the imaging unit 100, for each predetermined imaging area, for example, for each of colors of the patches, and then stores the averages, as the initial reference RGB values RdGdBd, in the memory table Tb1 in the nonvolatile memory 125. Therefore, the color measurement control unit 120 functions as an averaging unit.

The initial reference RGB value RdGdBd to be set is not limited to the average of the RGB values that are obtained through a plurality of imagings from among the RGB values of each of the patches of the reference chart KC that the imaging unit 100 has captured multiple times together with the reference sheet KS. For example, it may be possible to set, as the initial reference RGB value RdGdBd, an appropriate RGB value, such as an RGB value captured for the first time, an RGB value captured in an arbitrary order, or an RGB value being a median value.

In the image forming apparatus 1-2 according to the second embodiment, after the reference colorimetric values, the imaged reference RGB values, and the initial reference RGB values RdGdBd are stored in the nonvolatile memory 125, similarly to the first embodiment, the colorimetric value calculating unit 126 calculates the first linear transformation matrix (the reference-value linear transformation matrix) for converting between the XYZ value being the reference colorimetric value and the imaged reference RGB value, which are stored as a pair in the nonvolatile memory 125, i.e., a pair of the XYZ value and the imaged reference RGB value associated with the same patch number, and stores the calculated first linear transformation matrix in the nonvolatile memory 125.

In the image forming apparatus 1-2, the above processes are performed when the image forming apparatus 1-2 is in the initial state such that the reference colorimetric values, the imaged reference RGB values, and the initial reference RGB values RdGdBd, which are execution results, are registered in the memory table Tb1 in the nonvolatile memory 125 and then the first linear transformation matrix is calculated and stored in the nonvolatile memory 125.

As will be described later, when performing the color adjustment process, the image forming apparatus 1-2 according to the second embodiment captures the color measurement adjustment patches CP, which are formed on the recording medium P by the recording head 20 that may have changed over time, and the reference chart KC arranged inside the frame 102 by using the image sensor section 104, and outputs the image data including the color measurement adjustment patches CP and the reference chart KC to the color measurement control unit 120. The color measurement control unit 120 converts the measurement values of the color measurement adjustment patches CP, which are captured by the image sensor section 104 in the color adjustment process and obtained from the imaging unit 100, into the initial reference RGB values RdGdBd of the patches Pa to Pe of the reference chart KC that are read and stored when the imaging unit 100 reads the reference color patches (hereinafter, described as the initial reference color patches) of the reference sheet KS. Subsequently, the color measurement control unit 120 performs, on the initial reference RGB values RdGdBd, the same color measurement process as that of the first embodiment.

Specifically, the calculating unit 124 controls the operation of the color measurement control unit 120, and the colorimetric value calculating unit 126 performs the color measurement process and outputs colorimetric values as a processing result of the color measurement process to the CPU 41. The CPU 41 performs the color adjustment process on the image data by using the colorimetric values and controls the recording head 20 based on the image data subjected to the color adjustment process, so that an image can be formed with improved color reproducibility. The colorimetric value calculating unit 126 functions as an inter-reference-RGB linear transformation matrix generating unit, an RGB value converting unit, a reference-value linear transformation matrix calculating unit, an imaged colorimetric value calculating unit, a patch selecting unit, an RGB selecting unit, a selection-RGB-value linear transformation matrix calculating unit, and a colorimetric value converting unit. The imaging unit 100 and the color measurement control unit 120 integrally function as the color measuring device.

The image forming apparatus 1-2 according to the second embodiment includes a color measuring device that reads a color measuring program for implementing a color measuring method of the second embodiment from a computer-readable recording medium, such as a ROM, an EEPROM, an EPROM, a flash memory, a flexible disk, a CD-ROM, a CD-RW, a DVD, an SD card, or an MO, and loads the color measuring program onto the ROM 42 or the nonvolatile memory 125 to thereby implement the color measuring method to realize stable color reproducibility at low costs with a temporal change taken into account as will be described later. The color measuring program is a computer-executable program written in a legacy programming language, such as an assembly language, C, C++, C#, or Java (registered trademark), or an object-oriented programming language, and can be distributed by being stored in the recording medium as described above.

Operations according to the second embodiment will be explained below. The image forming apparatus 1-2 according to the second embodiment implements the color measuring method to realize stable color reproducibility at low costs by taking a temporal change into account.

As illustrated in FIG. 8, the image forming apparatus 1-2 according to the second embodiment stores, as the reference colorimetric values, at least one of the Lab value and the XYZ value, which are colorimetric values as a color measurement result that the spectrometer (the color measuring device) BS has obtained by reading a plurality of the reference color patches arrayed on the reference sheet KS, in the memory table Tb1 in the nonvolatile memory 125 in association with the patch numbers.

When the reference colorimetric values are stored in the memory table Tb1 in the nonvolatile memory 125 and the image forming apparatus 1-2 is in the initial state because of manufacturing or overhaul, the image forming apparatus 1-2 sets the reference sheet KS on the platen 14 of the image forming apparatus 1-2, controls the movement of the carriage 6, and causes the imaging unit 100 to read the same reference color patches KP of the reference sheet KS as those read by the spectrometer BS. The image forming apparatus 1-2 also captures each of the patches (the initial reference color patches) of the reference chart KC arranged inside the frame 102 as illustrated in FIG. 17.

Figures 18A, 18B:
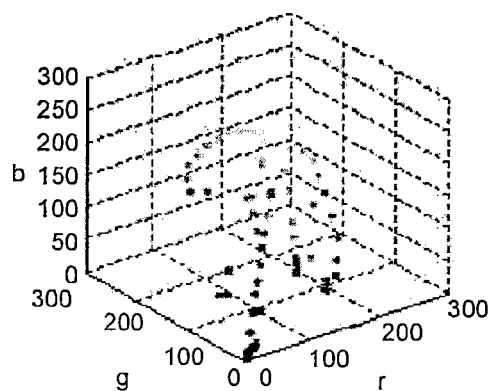
FIGS. 18A and 18B are diagrams illustrating an example of an initial reference value.

After the imaging unit 100 captures the reference color patches of the reference sheet KS and the patches of the reference chart KC, the calculating unit 124 of the color measurement control unit 120 stores the imaged reference RGB values, which are RGB values obtained by processing the image data of the captured reference patches of the reference sheet KS by the image processing unit 110, i.e., device-dependent signals dependent on the device, in the memory table Tb1 in the nonvolatile memory 125 in association with the patch numbers, i.e., in association with the reference colorimetric values, as illustrated in FIG. 8. Furthermore, the calculating unit 124 stores the initial reference RGB values RdGdBd, which are RGB values obtained by reading and processing the initial reference color patches of the reference chart KC by the image processing unit 110, in the nonvolatile memory 125 as illustrated in FIG. 18A.

Figure 17:
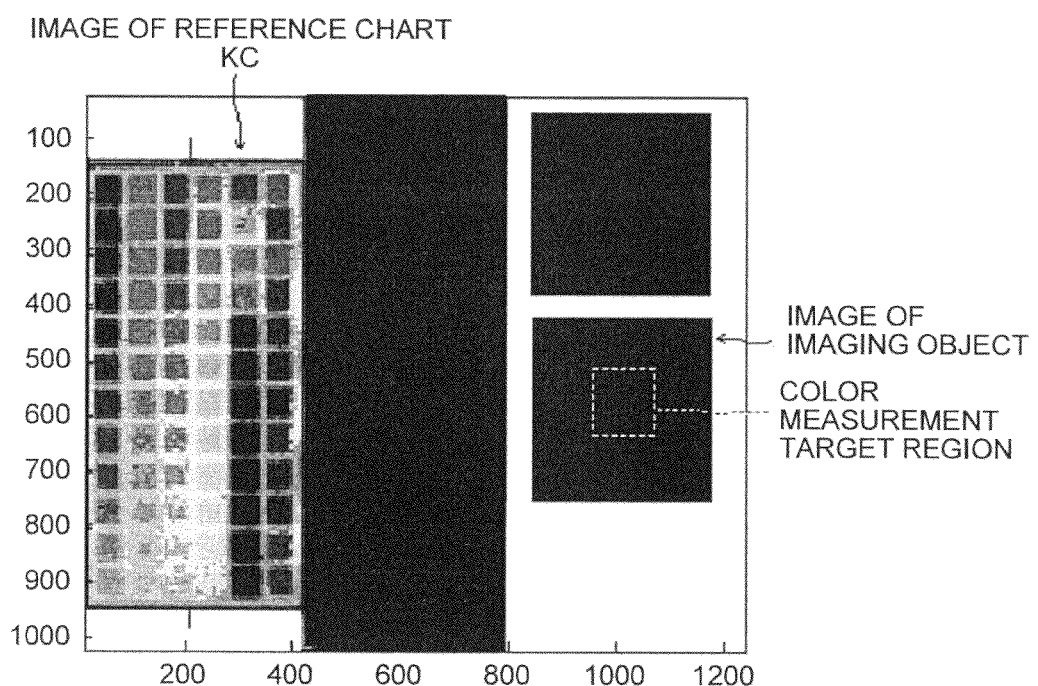
FIG. 17 is a diagram illustrating an example of image data obtained by simultaneously capturing the reference chart and an imaging object.

The calculating unit 124 calculates an average for each predetermined region, for example, a region indicated by a dashed line in FIG. 17 (a color measurement target region) of the image data of the initial reference color patches of the reference chart KC read by the imaging unit 100, and regards the averages as the initial reference RGB values RdGdBd. If the initial reference RGB values RdGdBd are calculated by averaging a number of pixels in the measurement target region as described above, it becomes possible to reduce the influence of noise and improve the bit resolution. FIG. 18B is a scatter diagram of the initial reference RGB values RdGdBd. FIG. 18A illustrates a state in which reference Lab values Ldadbd, which are Lab values converted from the initial reference RGB values RdGdBd, and reference XYZ values xdydzd, which are XYZ values converted from the initial reference RGB values RdGdBd, are registered in the nonvolatile memory 125.

After the image forming apparatus 1 stores the reference colorimetric values, the imaged reference RGB values, and the initial reference RGB values RdGdBd in the nonvolatile memory 125, the colorimetric value calculating unit 126 of the calculating unit 124 calculates the first linear transformation matrix for converting the XYZ value of the reference colorimetric value stored in the nonvolatile memory 125 and the imaged reference RGB value as a pair, i.e., a pair of the XYZ value and the imaged reference RGB value associated with the same patch number, and stores the calculated first linear transformation matrix in the nonvolatile memory 125.

In this state, the CPU 41 controls the movement of the carriage 6 in the main-scanning direction, controls conveyance of the recording medium P by the sheet conveying unit 48, and controls driving of the recording head 20 based on the image data or a print setting input from an external apparatus, to thereby intermittently convey the recording medium P and cause the recording heads 20$y$, 20$m$, 20$c$, and 20$k$ of the recording head 20 to eject ink to output or record an image on the recording medium P.

In this state, the ink ejection amount of the recording head 20$y$, 20$m$, 20$c$, or 20$k$ may change due to device-specific characteristics or may change over time. If the ink ejection amount changes, an image may be formed in colors different from colors desired by a user, resulting in reduced color reproducibility.

Therefore, the image forming apparatus 1-2 calculates a colorimetric value and performs a color adjustment process to adjust colors based on the colorimetric value at a predetermined color adjustment process timing.

Figure 19:
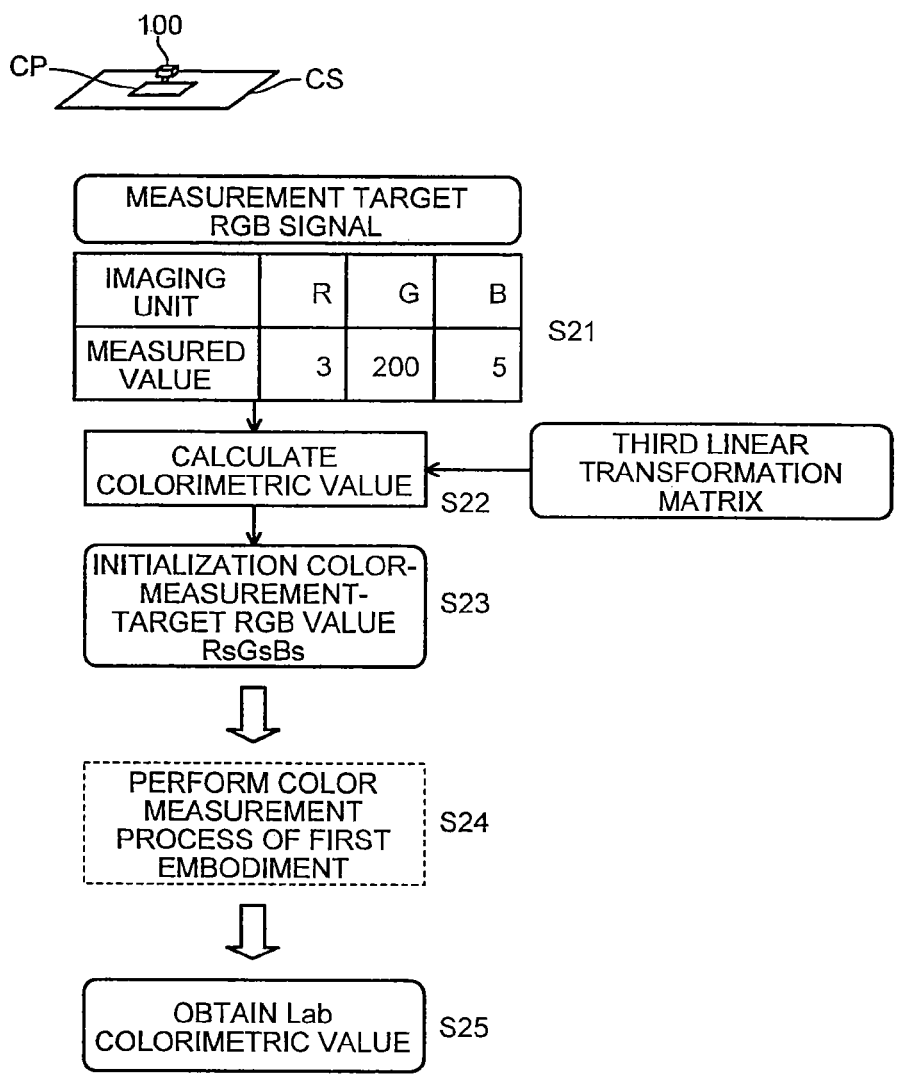
FIG. 19 is a diagram for explaining a color adjustment process according to the second embodiment.

Specifically, at the color adjustment process timing, similarly to the first embodiment, the image forming apparatus 1-2 forms a plurality of the color patches (the color measurement adjustment patches) CP on the recording medium P by the recording head 20 as illustrated in FIG. 19, and records or outputs the color measurement adjustment patches CP as the color measurement adjustment sheet CS. The color measurement adjustment sheet CS is formed of the color measurement adjustment patches CP that are a plurality of color patches for color measurement adjustment and that are formed by the recording head 20. The color measurement adjustment patches CP reflect the output characteristics of the image forming apparatus 1-2, in particular, the output characteristics of the recording head 20, at the color adjustment process timing. The color patch data of the color measurement adjustment patches CP is stored in advance in the nonvolatile memory 125 or the like.

As will be described later, the image forming apparatus 1-2 regards the RGB values obtained by capturing a plurality of the color measurement adjustment patches CP of the color measurement adjustment sheet CS as color-measurement-target RGB values (color-measurement RGB values), and converts the color-measurement-target RGB values into the initial reference RGB values RdGdBd. Subsequently, similarly to the first embodiment, the image forming apparatus 1-2 selects reference colorimetric values (neighboring reference colorimetric values) at close distances from the colorimetric values converted from the initial reference RGB values RdGdBd from among the reference colorimetric values registered in the memory table Tb1 in the nonvolatile memory 125, and calculates colorimetric values for converting the color-measurement-target RGB values into the selected neighboring reference colorimetric values. The image forming apparatus 1-2 outputs, by the recording head 20, an image of image data with colors converted based on the colorimetric values. Therefore, the color reproducibility of an image formed by the image forming apparatus 1-2 can be improved.

Specifically, as illustrated in FIG. 19, when the color measurement adjustment sheet CS is set on the platen 14 or when the color measurement adjustment sheet CS is maintained on the platen 14 without being discharged after the color measurement adjustment sheet CS is recorded, the image forming apparatus 1-2 causes the imaging unit 100 to capture a plurality of the color measurement adjustment patches CP of the color measurement adjustment sheet CS on the platen 14 and to capture the patches of the reference chart KC by controlling the movement of the carriage 6.

In the image forming apparatus 1-2, when the imaging unit 100 captures the color measurement adjustment patches CP of the color measurement adjustment sheet CS and the patches of the reference chart KC, the image processing unit 110 of the imaging unit 100 performs necessary image processing on the image data of the color measurement adjustment patches CP of the color measurement adjustment sheet CS and the image data of the reference chart KC. The image forming apparatus 1-2 then sends, to the color measurement control unit 120, pieces of the image data (the RGB values) of the color measurement adjustment patches CP of the color measurement adjustment sheet CS as the color-measurement-target RGB values, i.e., as the device-dependent signals dependent on the device, and the image data (the RGB values) of the patches of the reference chart as the color-measured reference RGB values RdsGdsBds. The color measurement control unit 120 temporarily stores the received values in the frame memory 121 as illustrated in FIG. 19 (Step S21).

In actuality, the color-measured reference RGB values RdsGdsBds are RGB values of the respective patches of the reference chart KC that is captured when the imaging unit 100 captures the color measurement adjustment patches CP of the color measurement adjustment sheet CS. The color measurement adjustment patches CP of the color measurement adjustment sheet CS are captured in sequence for each of the patches. Therefore, if the number of the color measurement adjustment patches CP of the color measurement adjustment sheet CS is large, for example, a few hundreds, the reference chart KC is also captured every time each of the color measurement adjustment patches CP is captured and a large number of pieces of imaged data of the reference chart KC are generated.

Therefore, in the image forming apparatus 1-2 according to the second embodiment, the color measurement control unit 120 obtains an average of the RGB values of all of the patches of the reference chart KC captured by the imaging unit 100, for each predetermined imaging area, for example, for each of colors of the patches. For example, the image forming apparatus 1-2 stores, as the color-measured reference RGB values RdsGdsBds, the averages of the RGB values in the nonvolatile memory 125. Therefore, the color measurement control unit 120 functions as an averaging unit.

The color-measured reference RGB value RdsGdsBds to be set are not limited to the average of the RGB values that are obtained through a plurality of imagings, from among the RGB values of each of the patches of the reference chart KC that the imaging unit 100 has captured multiple times together with the color measurement adjustment sheet CS. For example, it may be possible to set, as the color-measured reference RGB value RdsGdsBds, an appropriate RGB value, such as an RGB value captured for the first time, an RGB value captured in an arbitrary order, or an RGB value being a median value.

The colorimetric value calculating unit 126 of the calculating unit 124 converts the color-measurement-target RGB values stored in the frame memory 121 into the initialization color-measurement-target RGB values RsGsBs by using a third linear transformation matrix to be described later (Steps S22 and S23).

The calculating unit 124 of the color measurement control unit 120 regards the converted initialization color-measurement-target RGB values RsGsBs as the color-measurement-target RGB values of the first embodiment and performs the color measurement process in the same manner as in the first embodiment (Step S24), so that the Lab colorimetric values are obtained (Step S25).

Figure 20:
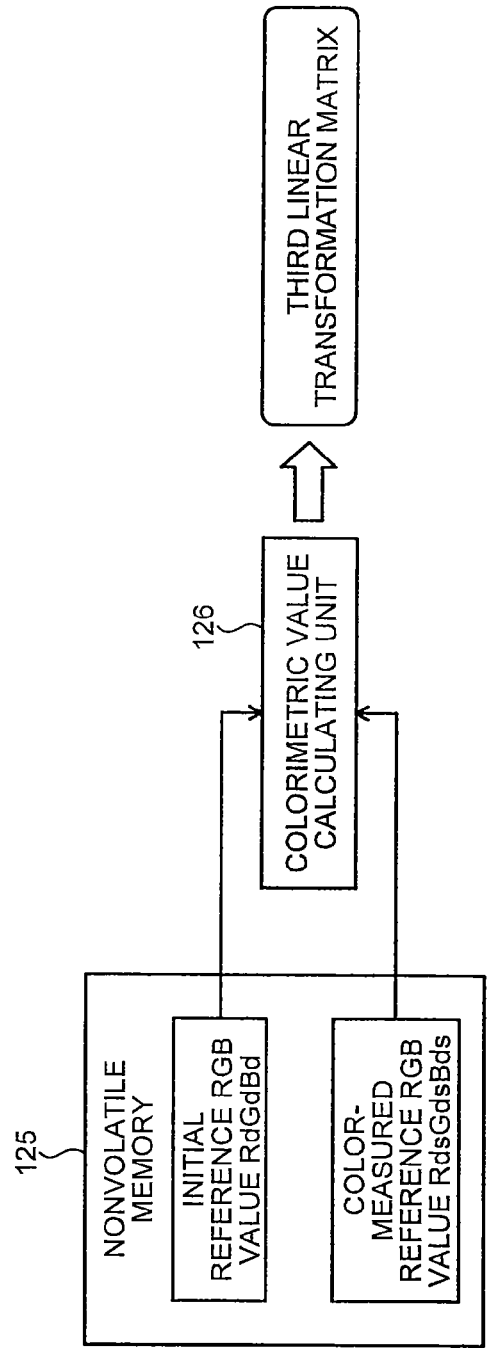
FIG. 20 is a diagram for explaining a process for generating a third linear transformation matrix.
Figure 21:
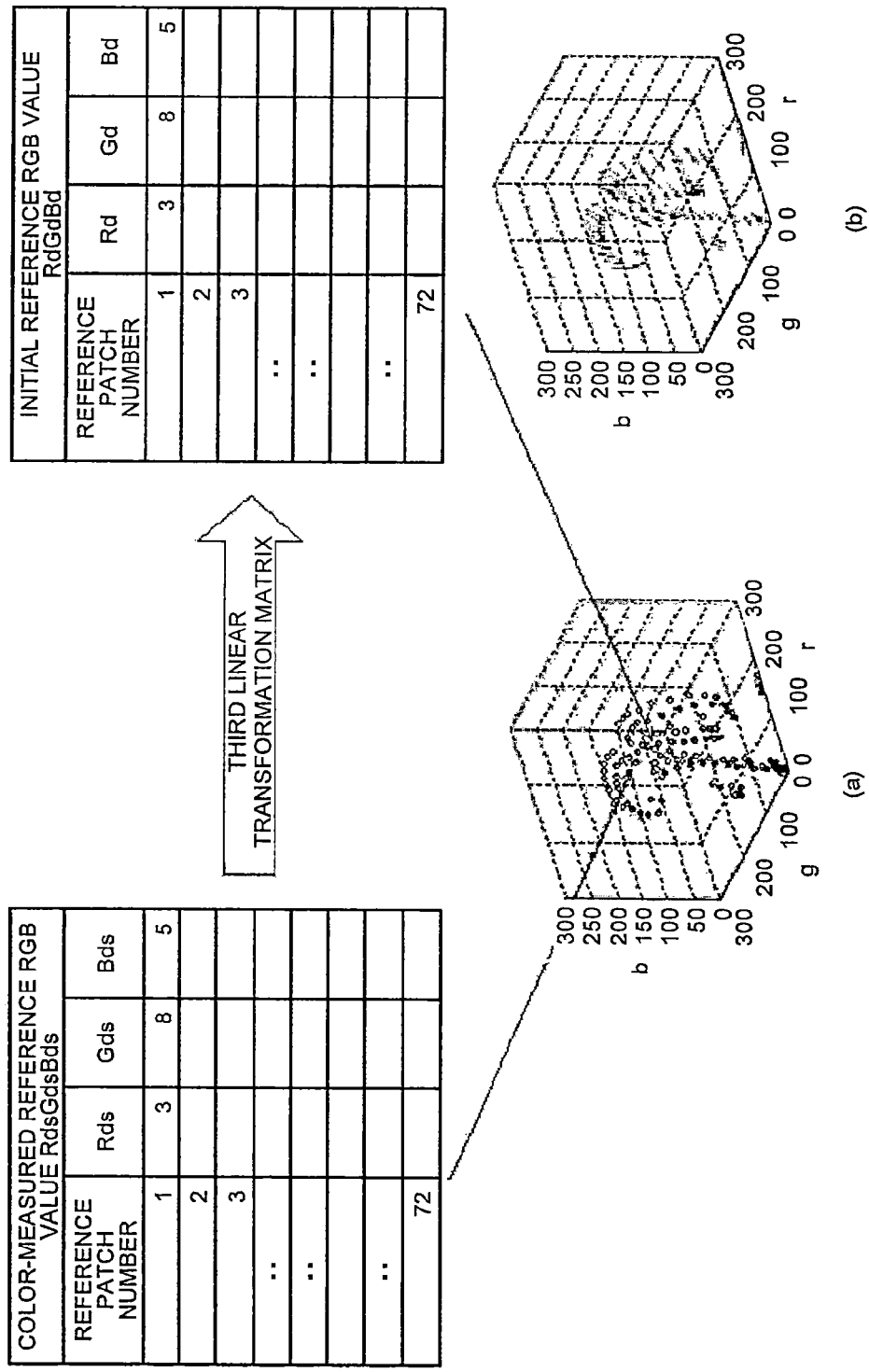
FIG. 21 is a diagram illustrating a relation between an initial reference RGB value and a color-measured reference RGB value.

Subsequently, the colorimetric value calculating unit 126 of the calculating unit 124 obtains the third linear transformation matrix as illustrated in FIG. 20 and FIG. 21.

Specifically, as illustrated in FIG. 20, the colorimetric value calculating unit 126 of the calculating unit 124 reads the initial reference RGB values RdGdBd and the color-measured reference RGB values RdsGdsBds from the nonvolatile memory 125. The initial reference RGB values RdGdBd are obtained by capturing the patches of the reference chart KC when the imaging unit 100 captures the reference color patches KP of the reference sheet KS, and are stored in the nonvolatile memory 125. The color-measured reference RGB values RdsGdsBds are obtained by capturing the patches of the reference chart KC when the imaging unit 100 captures the color measurement adjustment patches CP of the color measurement adjustment sheet CS upon color measurement, and are stored in the nonvolatile memory 125. The colorimetric value calculating unit 126 obtains the third linear transformation matrix for converting the color-measured reference RGB values RdsGdsBds into the initial reference RGB values RdGdBd, and stores the calculated third linear transformation matrix in the nonvolatile memory 125.

More specifically, in FIG. 21, white points in (a) of FIG. 21 are plot points of the initial reference RGB values RdGdBd in the rgb space, and black points are plot points of the color-measured reference RGB values RdsGdsBds in the rgb space. As can be seen from (a) of FIG. 21, the color-measured reference RGB values RdsGdsBds vary from the initial reference RGB values RdGdBd. The directions of the variations in the rgb space are approximately the same but the directions of deviations vary depending on hues as illustrated in (b) of FIG. 21. In this way, even when the same reference chart KC is captured, the RGB values vary because of, for example, a temporal change of the illumination light sources 107 or a temporal change of the two-dimensional image sensor 105.

In this way, when the variation occurs in the values obtained by capturing the same patches of the reference chart KC, if colorimetric values are obtained by using the color-measurement-target RGB values of the captured color measurement adjustment patches CP of the color measurement adjustment sheet CS in the same manner as in the first embodiment, the colorimetric values are influenced by the variations.

Therefore, the image forming apparatus 1-2 according to the second embodiment obtains the third linear transformation matrix to convert the color-measured reference RGB values RdsGdsBds into the initial reference RGB values RdGdBds by applying an estimation method, such as a least squares method, between the initial reference RGB values RdGdBd and the color-measured reference RGB values RdsGdsBds. Subsequently, the image forming apparatus 1-2 converts the color-measurement-target RGB values, which are obtained by capturing the color measurement adjustment patches CP of the color measurement adjustment sheet CS by the imaging unit 100 and stored in the nonvolatile memory 125, into the initialization color-measurement-target RGB values RsGsBs by using the third linear transformation matrix. Thereafter, the image forming apparatus 1-2 performs the same color measurement process as the first embodiment on the initialization color-measurement-target RGB values RsGsBs being the color-measurement-target RGB values, to thereby obtain the Lab colorimetric values.

The third linear transformation matrix may be a nonlinear matrix not only in a first order but also in a higher order. If the nonlinearity is high between the rgb space and the XYZ space, it is possible to improve the conversion accuracy by using a higher-order matrix.

Figure 22:
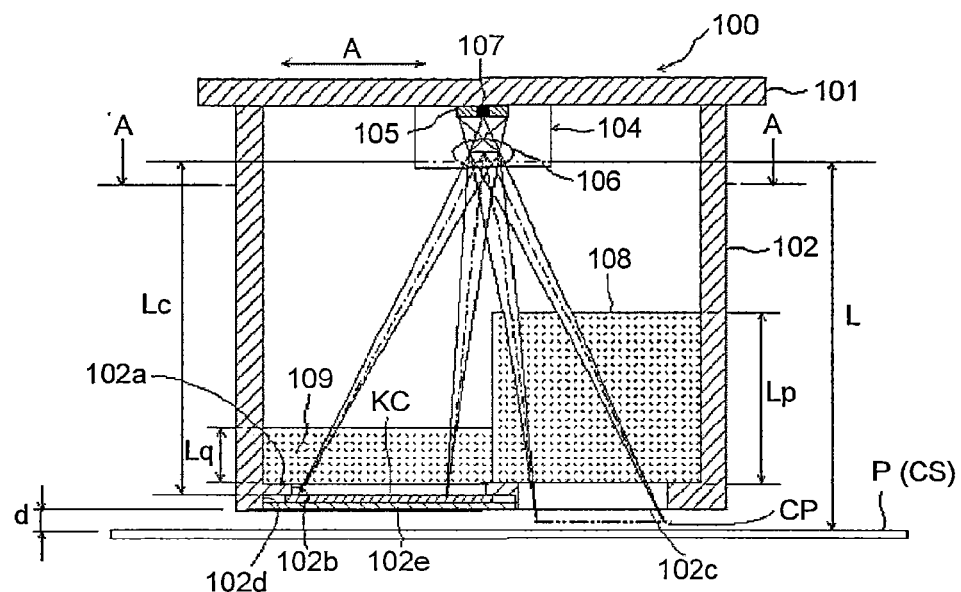
FIG. 22 is a front cross-sectional view of the imaging unit, in which optical path length changing members are provided on both of a color-measurement-object imaging side and a reference-sheet imaging side.
Figure 23:
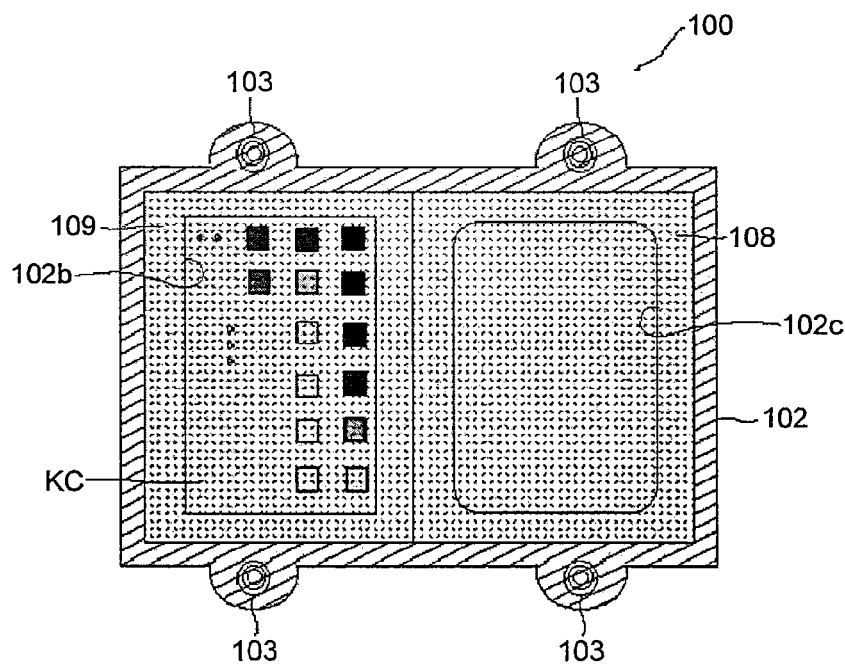
FIG. 23 is a cross-sectional view viewed in the direction of arrow A-A in FIG. 22.

A case has been explained above that, in the imaging unit 100, the optical path length changing member 108 is disposed on the optical path between the recording medium P and the two-dimensional image sensor 105 via the opening 102c. However, the optical path length changing member 108 does not necessarily have to be disposed on the optical path as described above. For example, as illustrated in FIG. 22 and FIG. 23, it may be possible to dispose an optical path length changing member 109 on the optical path between the reference chart KC disposed on the opening 102b and the two-dimensional image sensor, in addition to the optical path length changing member 108.

In this case, the optical path length changing member 109 is set such that the length Lq thereof becomes shorter than the length Lp of the optical path length changing member 108 and the focal length L calculated by Equation (2) based on the amount of floating C calculated by Equation (1) becomes the same as the focal length L of light that passes through the optical path length changing member 108.

In this way, if the optical path length changing members 108 and 109 are disposed on the both sides, i.e., on the recording medium P side and the reference chart KC side as described above, it becomes possible to match the focal length L to the recording medium P and the focal length L of the reference chart KC, enabling to measure colors with higher accuracy.

Figure 24:
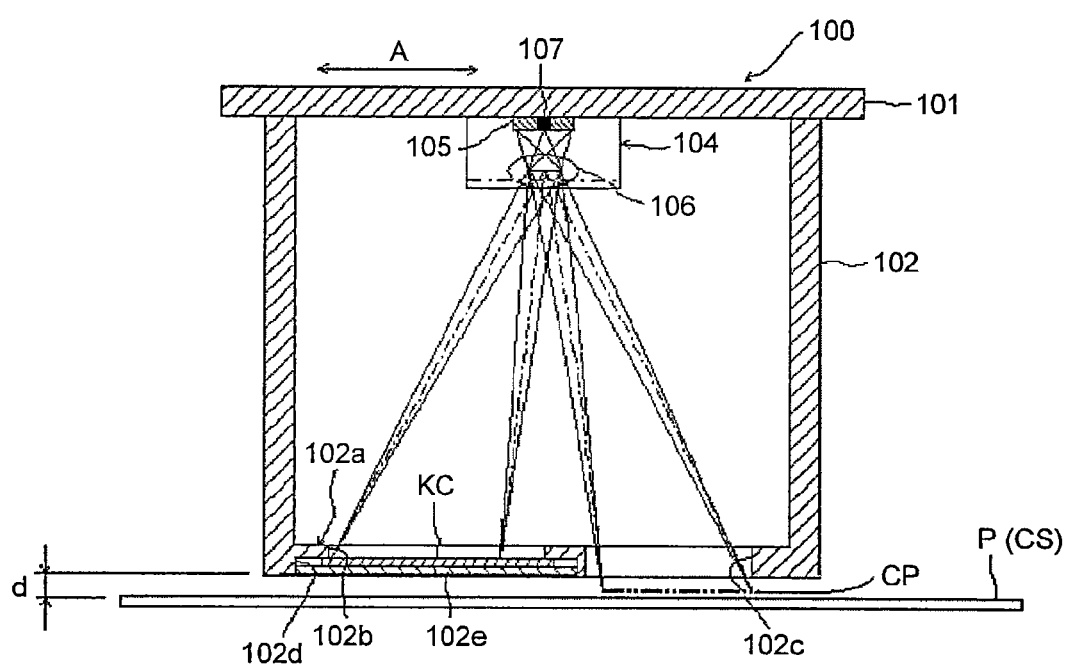
FIG. 24 is a front cross-sectional view of an imaging unit without an optical path length changing member.

Instead of providing the optical path length changing member 108 on the recording medium P side or providing the optical path length changing members 108 and 109 on both of the recording medium P side and the reference chart KC side in the imaging unit 100, as illustrated in FIG. 24, it may be possible to obtain data needed for the color measurement process even without providing the optical path length changing member on both of the recording medium P side and the reference chart KC side. In this case, although there is a difference between the optical path lengths of the reference chart KC and the recording medium P, if the difference is within the focal depth of the lens 106, images can be captured for the color measurement process without any problem.

In this way, the image forming apparatus 1-2 according to the second embodiment includes a color measuring unit that includes: the imaging unit (or the obtaining unit) 100 that captures the reference chart KC formed of a plurality of colors and captures an arbitrary subject to obtain an RGB value of the reference chart KC and an RGB value of the subject; the nonvolatile memory (the reference value storing unit) 125 for storing a reference colorimetric value that is a device-independent colorimetric value of each of the colors of the reference color patches KP in a predetermined color space, an imaged reference RGB value that is an RGB value of each of the colors of the reference color patches KP captured by the imaging unit 100, and an initial reference RGB value RdGdBd that is an RGB value of the reference chart KC that the imaging unit 100 has captured together with the reference color patches KP, in an associated manner; the nonvolatile memory (the color-measured RGB value storing unit) 125 for storing color-measurement-target RGB values (color-measurement RGB values) of the color measurement adjustment patches CP of the color measurement adjustment sheet CS captured as a predetermined color measurement object by the imaging unit 100, and a color-measured reference RGB value RdsGdsBds that is an RGB value of the reference chart KC captured together with the color measurement adjustment patches CP; the colorimetric value calculating unit (the inter-reference-RGB linear transformation matrix generating unit) 126 that generates the third linear transformation matrix (the inter-reference-RGB linear transformation matrix) for converting the color-measured reference RGB value RdsGdsBds into the initial reference RGB value RdGdBd; the colorimetric value calculating unit (the RGB value converting unit) 126 that converts the color-measurement-target RGB value into the initial color-measurement-target RGB value (the initial color-measurement RGB value) RsGsBs by using the third linear transformation matrix; the colorimetric value calculating unit (the reference-value linear transformation matrix calculating unit) 126 that calculates the first linear transformation matrix (the reference-value linear transformation matrix) for converting the imaged reference RGB value into the reference colorimetric value; the colorimetric value calculating unit (the imaged colorimetric value calculating unit) 126 that calculates an imaged colorimetric value by converting the initial color-measurement RGB value RsGsBs, which has been converted by the colorimetric value calculating unit 126, into the colorimetric value by using the first linear transformation matrix; the colorimetric value calculating unit (the patch selecting unit) 126 that selects a predetermined number of the reference color patches KP at close distances from the imaged colorimetric value from among the reference color patches KP; the colorimetric value calculating unit (the RGB selecting unit) 126 that selects, as selection RGB values, the color-measurement-target RGB values corresponding to the predetermined number of the selected reference color patches KP; the colorimetric value calculating unit (the selection-RGB-value linear transformation matrix calculating unit) 126 that calculates the second linear transformation matrix (the selection-RGB-value linear transformation matrix) for converting the selection RGB values into the reference colorimetric values; and the colorimetric value calculating unit (the colorimetric value converting unit) 126 that converts the RGB values of the color measurement adjustment patches CP captured by the imaging unit 100 into the colorimetric values by using the second linear transformation matrix.

Therefore, even when the color-measurement RGB values of the color measurement adjustment patches CP obtained upon capturing changes due to a temporal change of the imaging unit 100 or the like, it is possible to correct the change and to obtain the colorimetric value by extracting a section having the linearity from the color measurement adjustment patches CP and performing linear transformation of the extracted section. Consequently, it is possible to realize more stable color reproducibility with reduced distortion at lower costs.

Furthermore, in the image forming apparatus 1-2 according to the second embodiment, the color measuring unit performs a color measuring method that includes: an imaging step for capturing the reference chart KC formed of a plurality of colors and capturing an arbitrary subject to obtain an RGB value of the reference chart KC and an RGB value of the subject; a reference value storing step for storing a reference colorimetric value that is a device-independent colorimetric value of each of the colors of the reference color patches KP in a predetermined color space, an imaged reference RGB value that is an RGB value of each of the colors of the reference color patches KP captured at the imaging step, and an initial reference RGB value RdGdBd that is an RGB value of the reference chart KC captured together with the reference color patches KP at the imaging step, in the nonvolatile memory (the reference value storing unit) 125 in an associated manner; a color-measured RGB value storing step for storing color-measurement-target RGB values (color-measurement RGB values) of the color measurement adjustment patches CP of the color measurement adjustment sheet CS captured as a predetermined color measurement object at the imaging step, and a color-measured reference RGB value RdsGdsBds that is an RGB value of the reference chart KC captured together with the color measurement adjustment patches CP, in the nonvolatile memory (the color-measured RGB value storing unit) 125; an inter-reference-RGB linear transformation matrix generating step for generating the third linear transformation matrix (the inter-reference-RGB linear transformation matrix) for converting the color-measured reference RGB value RdsGdsBds into the initial reference RGB value RdGdBd; an RGB value converting step for converting the color-measurement-target RGB value into the initial color-measurement-target RGB value (the initial color-measurement RGB value) RsGsBs by using the third linear transformation matrix; a reference-value linear transformation matrix calculating step for calculating the first linear transformation matrix (the reference-value linear transformation matrix) for converting the imaged reference RGB value into the reference colorimetric value; an imaged colorimetric value calculating step for calculating an imaged colorimetric value by converting the initialization color-measurement-target RGB value RsGsBs, which has been converted at the RGB value converting step, into the colorimetric value by using the first linear transformation matrix; a patch selecting step for selecting a predetermined number of the reference color patches KP at close distances from the imaged colorimetric value from among the reference color patches KP; an RGB selecting step for selecting, as selection RGB values, the color-measurement-target RGB values corresponding to the predetermined number of the selected reference color patches KP; a selection-RGB-value linear transformation matrix calculating step for calculating the second linear transformation matrix (the selection-RGB-value linear transformation matrix) for converting the selection RGB values into the reference colorimetric values; and a colorimetric value converting step for converting the RGB values of the color measurement adjustment patches CP captured at the imaging step into the colorimetric values by using the second linear transformation matrix.

Therefore, even when the color-measurement RGB values of the color measurement adjustment patches CP obtained upon capturing changes due to a temporal change of the imaging unit 100 or the like, it is possible to correct the change and to obtain the colorimetric value by extracting a section having the linearity from the color measurement adjustment patches CP and performing linear transformation of the extracted section. Consequently, it is possible to realize more stable color reproducibility with reduced distortion at lower costs.

Moreover, the image forming apparatus 1-2 according to the second embodiment includes a color measuring program that causes a computer to execute: an imaging process for capturing the reference chart KC formed of a plurality of colors and capturing an arbitrary subject to obtain an RGB value of the reference chart KC and an RGB value of the subject; a reference value storing process for storing a reference colorimetric value that is a device-independent colorimetric value of each of the colors of the reference color patches KP in a predetermined color space, an imaged reference RGB value that is an RGB value of each of the colors of the reference color patches KP captured by the imaging process, and an initial reference RGB value RdGdBd that is an RGB value of the reference chart KC captured together with the reference color patches KP in the imaging process, in the nonvolatile memory (the reference value storing unit) 125 in an associated manner; a color-measured RGB value storing process for storing color-measurement-target RGB values (color-measurement RGB values) of the color measurement adjustment patches CP of the color measurement adjustment sheet CS captured as a predetermined color measurement object in the imaging process, and a color-measured reference RGB value RdsGdsBds that is an RGB value of the reference chart KC captured together with the color measurement adjustment patches CP, in the nonvolatile memory (the color-measured RGB value storing unit) 125; an inter-reference-RGB linear transformation matrix generation process for generating the third linear transformation matrix (the inter-reference-RGB linear transformation matrix) for converting the color-measured reference RGB value RdsGdsBds into the initial reference RGB value RdGdBd; an RGB value conversion process for converting the color-measurement-target RGB value into the initial color-measurement-target RGB value (the initial color-measurement RGB value) RsGsBs by using the third linear transformation matrix; a reference-value linear transformation matrix calculation process for calculating the first linear transformation matrix (the reference-value linear transformation matrix) for converting the imaged reference RGB value into the reference colorimetric value; an imaged colorimetric value calculation process for calculating an imaged colorimetric value by converting the initialization color-measurement-target RGB value RsGsBs, which has been converted in the RGB value conversion process, into the colorimetric value by using the first linear transformation matrix; a patch selection process for selecting a predetermined number of the reference color patches KP at close distances from the imaged colorimetric value from among the reference color patches KP; an RGB selection process for selecting, as selection RGB values, the color-measurement-target RGB values corresponding to the predetermined number of the selected reference color patches KP; a selection-RGB-value linear transformation matrix calculation process for calculating the second linear transformation matrix (the selection RGB value linear transformation matrix) to convert the selection RGB values into the reference colorimetric values; and a colorimetric value conversion process for converting the RGB values of the color measurement adjustment patches CP captured in the imaging process into the colorimetric values by using the second linear transformation matrix.

Therefore, even when the color-measurement RGB values of the color measurement adjustment patches CP obtained upon capturing changes due to a temporal change of the imaging unit 100 or the like, it is possible to correct the change and to obtain the colorimetric value by extracting a section having the linearity from the color measurement adjustment patches CP and performing linear transformation of the extracted section. Consequently, it is possible to realize more stable color reproducibility with reduced distortion at lower costs.

Furthermore, in the image forming apparatus 1-2 according to the second embodiment, the reference chart KC is formed of patch arrays of some of the colors of the reference color patches KP.

Therefore, it is possible to further improve the linearity, enabling to realize more stable color reproducibility with reduced distortion at lower costs.

Moreover, in the image forming apparatus 1-2 according to the second embodiment, the colorimetric value calculating unit 126 of the imaging unit 100 functions as an averaging unit that obtains, as the color-measurement RGB value, an average of the ROB values of the captured color measurement adjustment patches CP, with respect to each predetermined measurement target region.

Therefore, it is possible to average a number of pixels, enabling to reduce the influence of noise and improve the bit resolution.

Furthermore, in the image forming apparatus 1-2 according to the second embodiment, the colorimetric value calculating unit 126 of the imaging unit 100 functions as an averaging unit that obtains, as the initial reference RGB value RdGdBd or/and the color-measured reference RGB value RdsGdsBds, at least an average of the RGB values of the reference color patches KP or an average of the RGB values of the reference chart KC captured together with the color measurement adjustment patches CP (the color measurement object), with respect to each predetermined imaging area of the reference chart KC.

Therefore, it is possible to average a number of pixels, enabling to reduce the influence of noise and improve the bit resolution.

Figure 25:
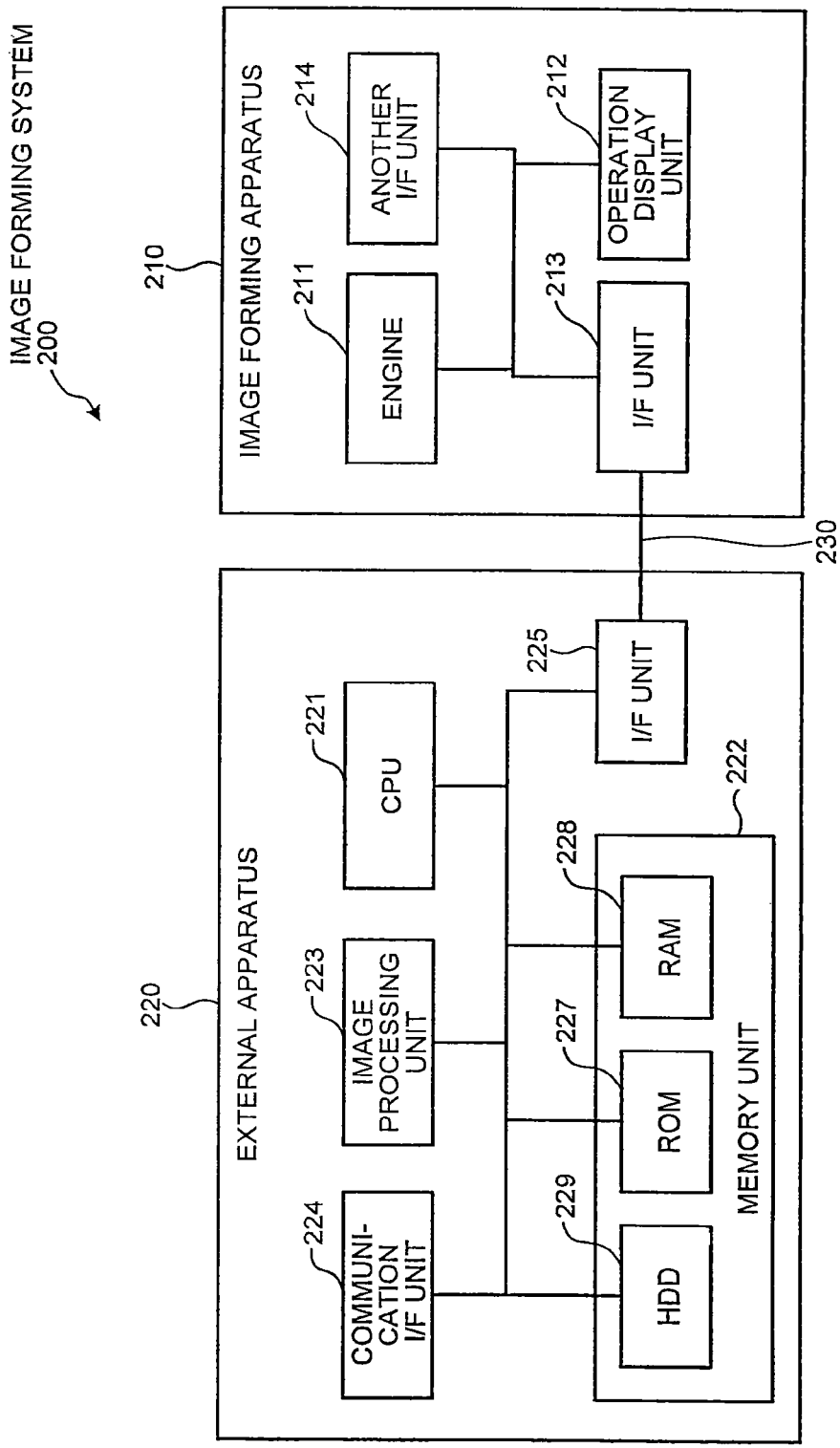
FIG. 25 is a block diagram illustrating a configuration of main parts of an image forming system to which a color measuring system is applied.

While the CPU 41 or the color measurement control unit 120 of the image forming apparatus 1-2 performs the color measurement process in the above embodiments, the color measurement process does not necessarily have to be performed by the image forming apparatus 1-2. For example, as illustrated in FIG. 25, an image forming system (a color measuring system) 200 may be provided such that an image forming apparatus 210 is connected to an external apparatus 220, image data captured by the image forming apparatus 210 is output to the external apparatus 220, the external apparatus 220 performs a color adjustment process involving the color measurement process, the image data subjected to the color adjustment process is output to the image forming apparatus 210, and the image forming apparatus 210 forms an image based on the image data obtained from the external apparatus 220.

Specifically, the image forming apparatus 210 includes an engine 211, an operation display unit 212, an I/F unit 213, and another I/F unit 214, all of which are connected to one another via a bus 215.

The external apparatus 220 may be realized by, for example, a computer having a normal hardware configuration and a software configuration. The color adjustment process involving the color measurement process can be executed by providing, as software, a color adjustment program that includes the color measuring program for executing the color adjustment process involving the color measurement process of the second embodiment. The external apparatus 220 includes a CPU 221, a memory unit 222, an image processing unit 223, a communication I/F unit 224, and an I/F unit 225, all of which are connected to one another via a bus 226. The memory unit 222 includes a ROM 227, a RAM 228, and a hard disk (HDD) 229.

The image forming apparatus 210 is connected to the external apparatus 220 via the I/F unit 213 through a line 230. The line 230 may be a wired line or a wireless line, such as a dedicated line, a network, such as a LAN (Local Area Network), or the Internet.

The image forming apparatus 210 forms and outputs an image onto a recording medium by using the engine 211 based on the image data sent by the external apparatus 220 under the control of the external apparatus 220. The engine 211 forms an image on a recording medium by using an inkjet method. The operation display unit 212 includes various operation keys and a display, such as an LCD (Liquid Crystal Display). Various operations needed to operate the image forming apparatus 210 are performed via the operation keys and various types of information notified by the image forming apparatus 210 to a user are displayed on the display. The other I/F unit 214 is used to connect an extended unit or the like.

The engine 211 includes a carriage that moves in the main-scanning direction in the same manner as in the embodiments described above. The obtaining unit 30 explained in the first embodiment or the imaging unit 100 explained in the second embodiment is mounted on the carriage. The image forming apparatus 210 generates the color measurement adjustment sheet CS by forming the color measurement adjustment patches CP on the recording medium based on the color patch data of the color measurement adjustment patches CP sent from the external apparatus 220 under the control of the external apparatus 220. The image forming apparatus 210 reads the color measurement adjustment patches CP of the generated color measurement adjustment sheet CS by using the imaging unit, and transmits the read data to the external apparatus 220 via the I/F unit 213.

In the external apparatus 220, an image formation control program to control the operations of the image forming apparatus 210, a color adjustment program to perform the color adjustment process involving the color measurement process of the second embodiment, and necessary data are stored in the hard disk 229 or the ROM 227. The CPU 221 controls the image forming apparatus 210 based on the programs stored in the ROM 227 or the hard disk 229 to perform basic processing of the image forming apparatus 210, to thereby perform the color adjustment process involving the color measurement process of the second embodiment.

The hard disk 229 stores therein the programs as described above, and also stores therein, and various types of data needed to perform the color adjustment process. In particular, the hard disk 229 stores therein at least one of the Lab value and the XYZ value (in FIG. 8, both of the Lab value and the XYZ value), which are the color measurement result of a plurality of the reference color patches KP arrayed in the reference sheet KS explained in the above embodiment, the imaged reference RGB values obtained by reading the reference patches KP of the reference sheets KS by the imaging unit of the image forming apparatus 210, the first linear transformation matrix, a table of the neighboring point, and the second linear transformation matrix. Furthermore, when the imaging unit is the imaging unit 100 according to the second embodiment, the hard disk 229 stores therein the initial reference RGB value RdGdBd of each of the patches of the reference chart KC that is read together with the reference sheet KS, the color-measured reference RGB value RdsGdsBds of the reference patch of the reference chart KC that is read together with the color measurement adjustment patches CP of the color measurement adjustment sheet CS, and the third linear transformation matrix to convert the color-measured reference RGB value RdsGdsBds into the initial reference RGB value RdGdBd.

The communication I/F unit 224 is connected to an image processing apparatus, such as a scanner device, a multifunction peripheral, or other external devices, via a line, such as a network, and receives image data of an image to be output by the image forming apparatus 210.

The image processing unit 223 performs various types of image processing on image data needed to form and output an image by the engine 211 of the image forming apparatus 210.

The CPU 221 controls operations of the image forming apparatus 210 as described above, causes the CPU 41 of the first embodiment or the calculating unit 124 of the color measurement control unit 120 of the second embodiment, in particular, the colorimetric value calculating unit 126, to perform the color measurement process to obtain the colorimetric value, performs color adjustment of the image data based on the colorimetric value, and outputs the image data to the image forming apparatus 210.

In the image forming system 200 illustrated in FIG. 25, the external apparatus 220 controls the operations of the image forming apparatus 210. However, it may be possible to provide a controller, such as a CPU, in the image forming apparatus 210 such that the controller controls an image forming operation and the external apparatus 220 performs only the color measurement process to obtain the colorimetric value or performs the color adjustment process involving the color measurement process.

In this way, by causing at least an external apparatus of the image forming apparatus 210 to perform the color measurement process or the color adjustment process involving the color measurement process, it becomes possible to appropriately improve the color reproducibility at low costs even in the inexpensive image forming apparatus 210.

Modification

In the above embodiments, the number of the reference color patches is limited; therefore, in some cases, the color conversion accuracy may be reduced. In a modification, the Lab values (device-independent) obtained by a linear transformation of the RGB values (device-dependent) are transformed again in the same color space by using a linear transformation matrix. Thereafter, only a set of a predetermined number of color patches (neighboring color patches) with reference colorimetric values (Lab values) at close distances from the Lab values obtained by the two-staged transformation is selected. Consequently, it becomes possible to perform a color measurement process with stability and high accuracy.

The modification can be applied to both of the first embodiment and the second embodiment. In the following, a case of applying the modification to the first embodiment (hereinafter, this case may be referred to as a first case) and a case of applying the modification to the second embodiment (hereinafter, this case may be referred to as a second case) will be explained separately if needed.

Figure 26:
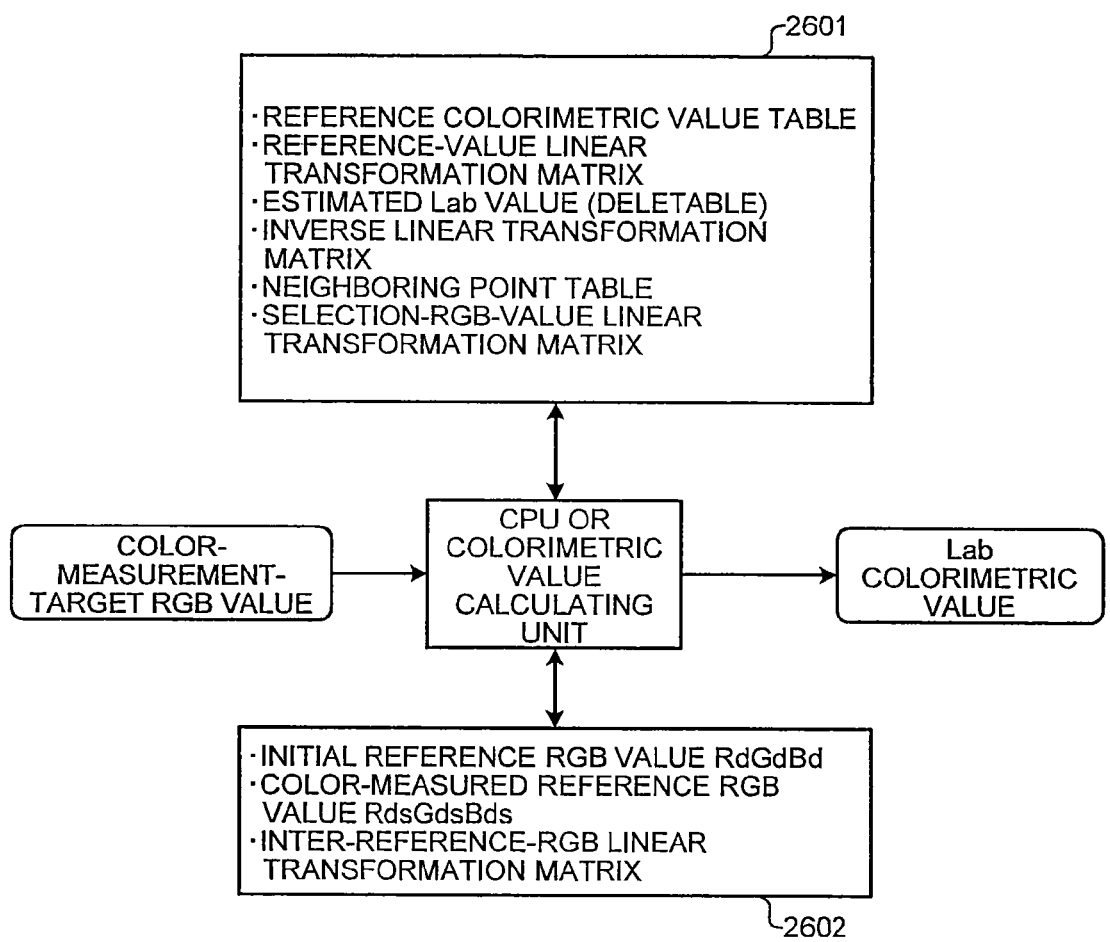
FIG. 26 is a diagram for explaining an example of information used in a modification.

FIG. 26 is a diagram for explaining an example of information used in the modification. Information 2601 is used in the first case and information 2602 is used in addition to the information 2601 in the first case. In the modification, a fourth linear transformation matrix (an inverse linear transformation matrix) and an estimated Lab value are used. The fourth linear transformation matrix and the estimated Lab value are stored in, for example, the nonvolatile memory 44 (in the first case) or the nonvolatile memory 125 (in the second case). The information 2601 and the information 2602 may be stored in storage unit other than the nonvolatile memory (the nonvolatile memory 44 or the nonvolatile memory 125) in a distributed manner.

Figure 27:
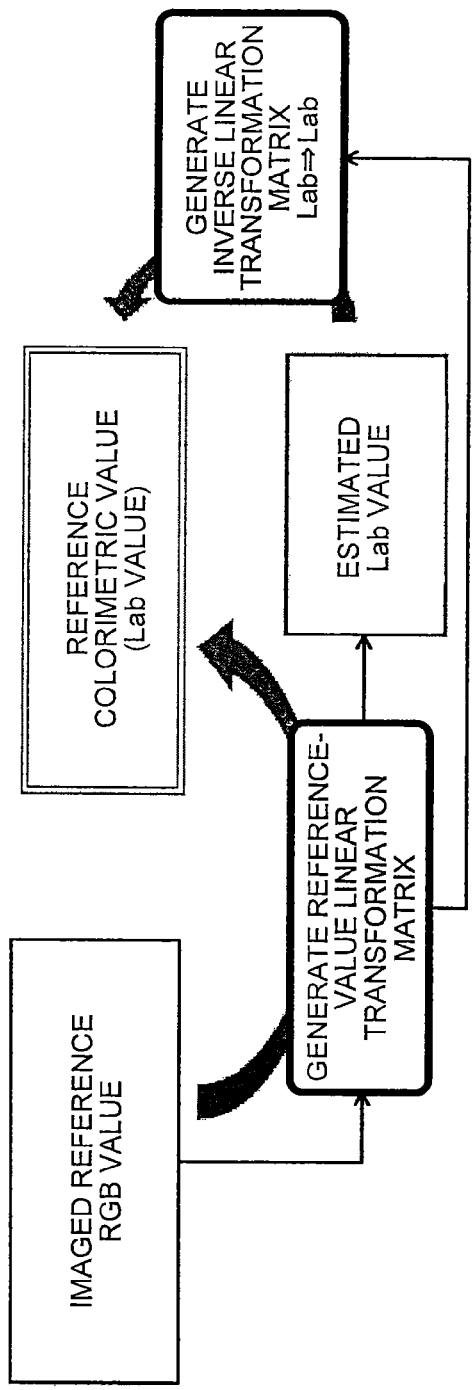
FIG. 27 is a diagram for explaining a process for generating a reference-value linear transformation matrix and an inverse linear transformation matrix.

FIG. 27 is a diagram for explaining a process for generating a reference-value linear transformation matrix and the inverse linear transformation matrix. In FIG. 27, an example of the first case is illustrated. In the following explanation, a subject color gamut is assumed as a color gamut based on Japan color for simplicity of the explanation. However, the color gamut can be changed according to the purpose.

Preprocessing Process 1

A spectrometer (not illustrated) measures colors of a plurality of reference color patches (for example, 928 patches of Japan color) for the whole subject color gamut. The color measured values are stored, as reference colorimetric values, in the memory table Tb1 similar to that illustrated in FIG. 8, for example. As described above, the colorimetric values may be one of the XYZ values and the Lab values, or both of the XYZ values and the Lab values.

Preprocessing Process 2

RGB values (imaged reference RGB values) obtained by capturing the reference color patches (for example, 928 patches of Japan color) by an imaging unit (the obtaining unit 30 or the imaging unit 100) are stored in the memory table Tb1 or the like in association with the reference colorimetric values.

Preprocessing Process 3

The reference-value linear transformation matrix is generated by using a least squares method based on the RGB values and the reference colorimetric values that are stored in the memory table Tb1 or the like.

Preprocessing Process 4

The all of the stored RGB values are converted into XYZ values by using the reference-value linear transformation matrix, and then the converted XYZ values are further converted into Lab values. In the modification, the Lab values obtained by the conversion are referred to as estimated Lab values. The estimated Lab values correspond to the first colorimetric values of the above embodiments.

Preprocessing Process 5

The inverse linear transformation matrix is generated based on the estimated Lab values and the Lab values (the Lab values of the reference colorimetric values) stored in the memory table Tb1 or the like.

The preprocessing processes 1 to 3 are the same as the processes performed in the above embodiments. For example, the preprocessing processes 1 to 3 can be performed in the same manner as in the process explained with reference to FIG. 8. In the modification, the inverse linear transformation matrix is generated by performing the preprocessing processes 4 and 5. The reference-value linear transformation matrix and the inverse linear transformation matrix are stored in the nonvolatile memory (the nonvolatile memory 44 or the nonvolatile memory 125) for example.

Figure 28:
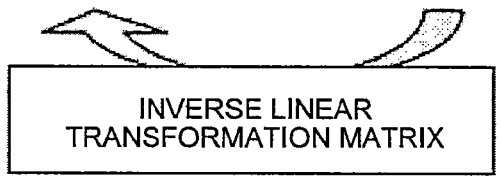
FIG. 28 is a diagram for explaining a process for generating the inverse linear transformation matrix.

FIG. 28 is a diagram for explaining a process for generating the inverse linear transformation matrix. The CPU 41 (of the first embodiment) or the colorimetric value calculating unit 126 (of the second embodiment) generates the inverse linear transformation matrix for converting the estimated Lab values into the Lab values of the reference colorimetric values, and stores the inverse linear transformation matrix in a storage unit.

Figure 29:
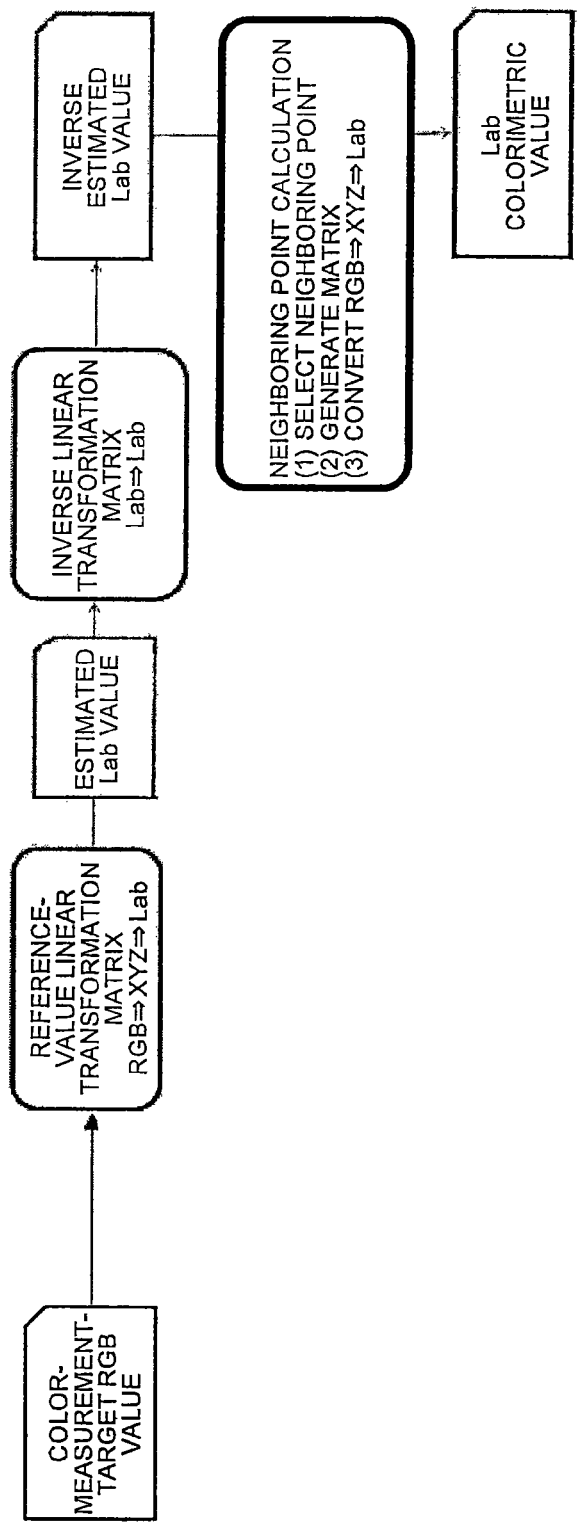
FIG. 29 is a diagram for explaining a general idea of a calculation performed in actual color measurement.

The overview of calculations performed in actual color measurement will be explained below. FIG. 29 is a diagram for explaining a general idea of the calculations in actual color measurement.

The CPU 41 (of the first embodiment) or the colorimetric value calculating unit 126 (of the second embodiment) calculates an RGB value (color-measurement-target RGB value) by averaging image data in an imaging range. For example, the color-measurement-target RGB value is obtained by capturing the color measurement adjustment patch CP in the same manner as explained with reference to FIG. 9.

The color-measurement-target RGB value is converted into an XYZ value by the reference-value linear transformation matrix, and then further converted from the XYZ value into a Lab value. The converted Lab value is used as an estimated Lab value (the first colorimetric value).

Figure 30:
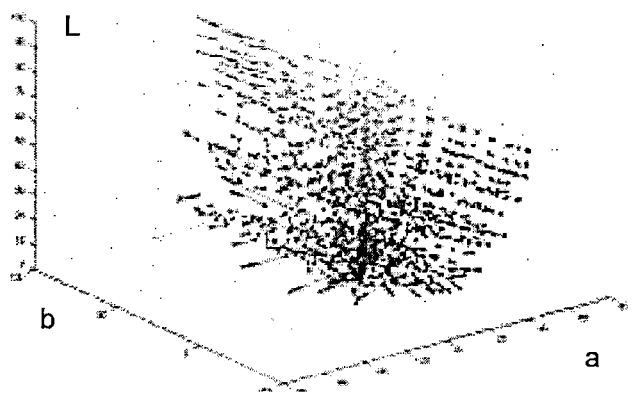
FIG. 30 is a diagram illustrating an example of an average color difference and a maximum color difference when the method of the modification is not applied.
Figure 31:
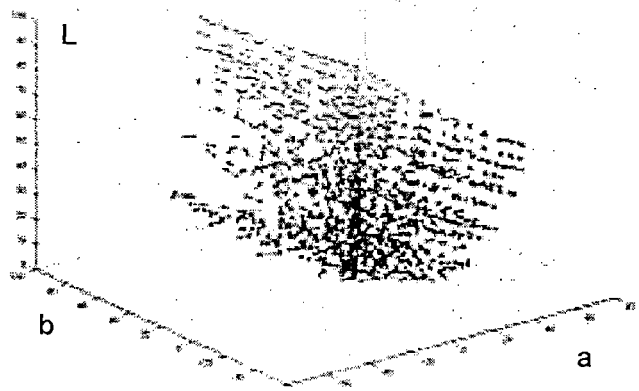
FIG. 31 is a diagram illustrating an example of an average color difference and a maximum color difference when the method of the modification is applied.

FIG. 30 is a diagram illustrating an example of an average color difference and a maximum color difference when the method of the modification is not applied. FIG. 31 is a diagram illustrating an example of an average color difference and a maximum color difference when the method of the modification is applied.

In FIG. 30, a difference between the Lab value of the reference colorimetric value (solid circular point) and the Lab value obtained by converting the color-measurement target RGB value by the reference-value linear transformation matrix are represented by a vector. The terminal point of the vector corresponds to the converted Lab value (the first colorimetric value). An average color difference of all of the points is 3.1. Incidentally, a difference becomes large in a certain space where a maximum color difference becomes 41.3. If neighboring points are searched for (selected) in the next process while the difference is large, a selection error may occur, which is a problem.

Therefore, in the modification, the first colorimetric value (the estimated Lab value) is further converted into an inverse estimated Lab value by the inverse linear transformation matrix (see FIG. 29). FIG. 31 illustrates an example of a result obtained by converting the first colorimetric value (the estimated Lab value) into a Lab value (the inverse estimated Lab value) by the inverse linear transformation matrix. As illustrated in FIG. 31, the maximum color difference is greatly reduced to 12.8. In this state, the neighboring points are selected in the next process. Consequently, it becomes possible to select points in a neighboring space with high accuracy, enabling to improve the accuracy of a neighboring point calculation.

Referring back to FIG. 29, the CPU 41 (of the first embodiment) or the colorimetric value calculating unit 126 (of the second embodiment) searches through the reference colorimetric values (the Lab values) of the color patches stored in advance in the memory table Tb1 or the like, and selects only a set of a predetermined number of color patches (neighboring color patches) with the reference colorimetric values (the Lab values) at close distances from the inverse estimated Lab values (see (1) of FIG. 29).

Subsequently, the CPU 41 (of the first embodiment) or the colorimetric value calculating unit 126 (of the second embodiment) selects imaged reference RGB values that form pairs with the Lab values of the selected set, and generates a matrix for converting the selected imaged reference RGB values into reference XYZ values (the selection-RGB-value linear transformation matrix) (see (2) of FIG. 29).

The CPU 41 (of the first embodiment) or the colorimetric value calculating unit 126 (of the second embodiment) converts the color-measurement-target RGB values into the XYZ values by using the selection-RGB-value linear transformation matrix, and converts the converted XYZ values into Lab values as final colorimetric values (see (3) of FIG. 29).

Figure 32:
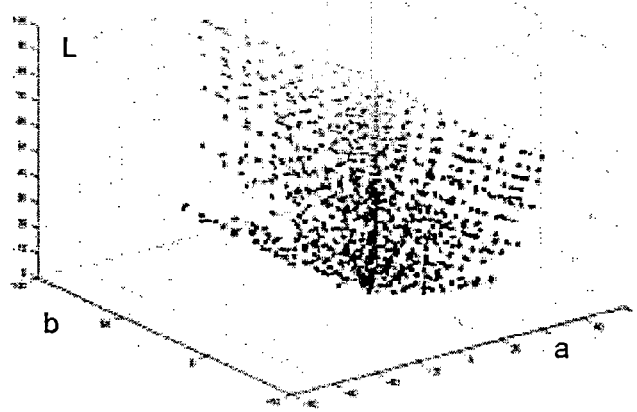
FIG. 32 is a diagram illustrating an example of an average color difference and a maximum color difference when the method of the modification is applied.

FIG. 32 is a diagram illustrating an example of an average color difference and a maximum color difference when the method according to the modification is applied. In FIG. 32, a difference between the Lab value (a solid circular point) of the reference colorimetric value and the final Lab colorimetric value is represented by a vector. The obtained results of the average color difference and the maximum color difference are preferable.

Figure 33:
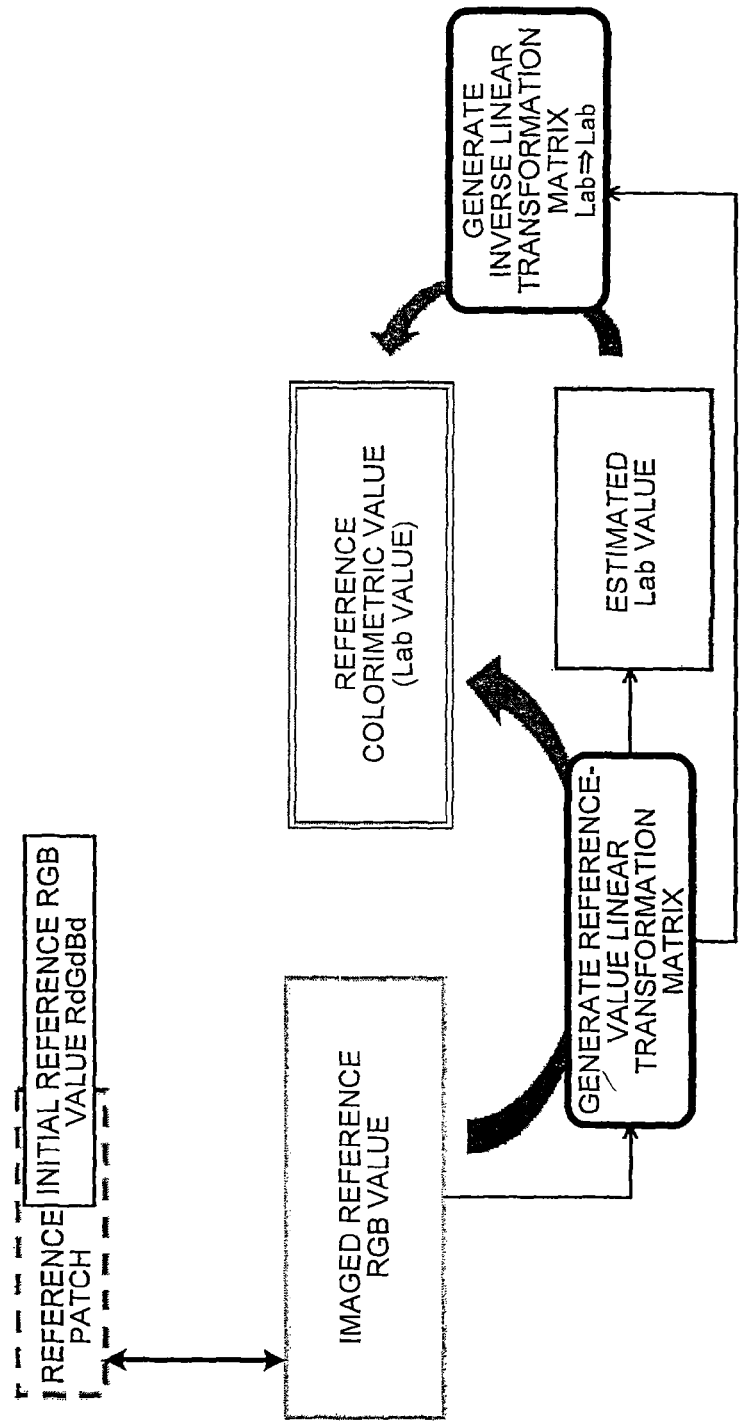
FIG. 33 is a diagram for explaining another example of a process for generating the reference-value linear transformation matrix and the inverse linear transformation matrix.

FIG. 33 is a diagram for explaining another example of a process for generating the reference-value linear transformation matrix and the inverse linear transformation matrix. In FIG. 33, an example of the second case is illustrated. A difference from the example of the first case illustrated in FIG. 27 is in that the RGB values (the initial reference RGB values RdGdBd) of the reference patches of the reference chart are acquired and stored at the same time the color-measurement-target RGB values are obtained.

Figure 34:
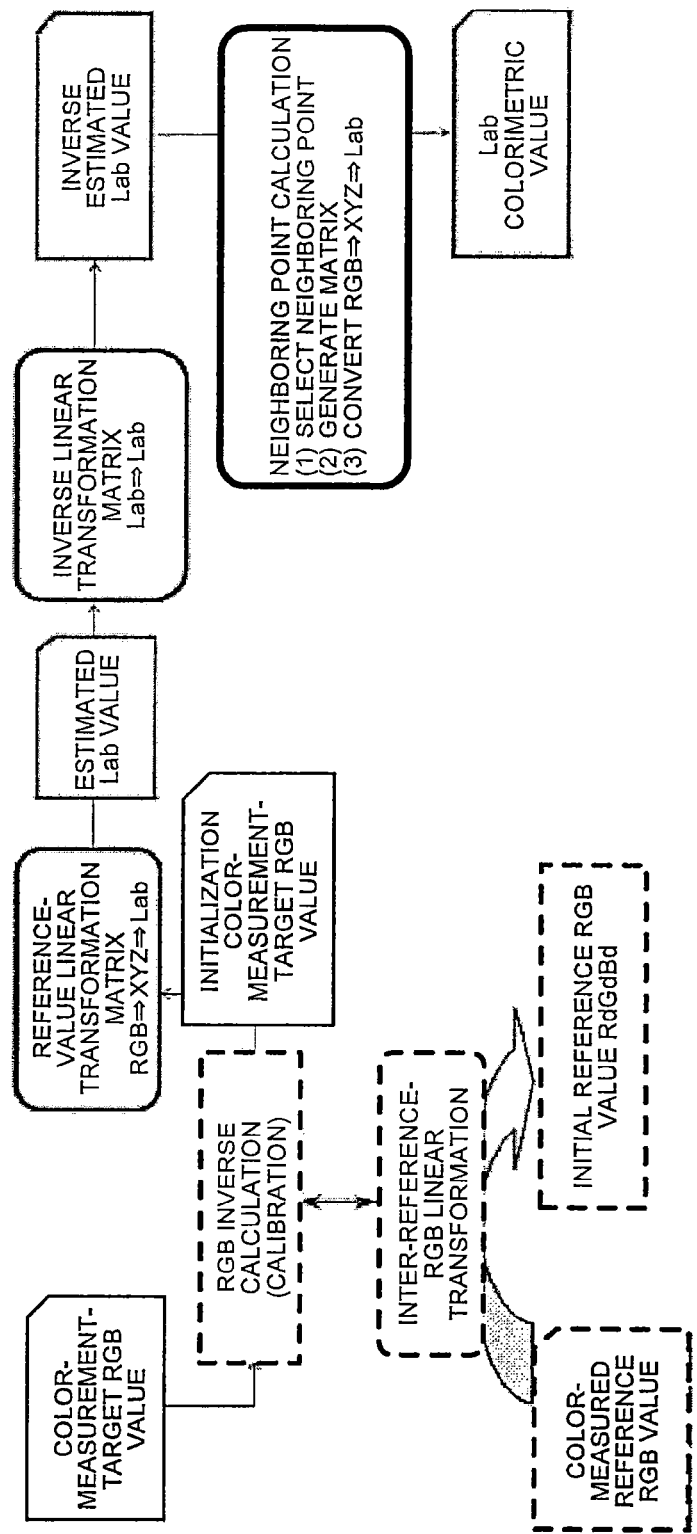
FIG. 34 is a diagram for explaining a general idea of a calculation in actual color measurement.

FIG. 34 is a diagram for explaining a general idea of the calculations in actual color measurement. The colorimetric value calculating unit 126 calculates the color-measurement-target RGB values, and regards the RGB values of the reference patches that are captured simultaneously as color-measured reference RGB values.

The colorimetric value calculating unit 126 generates the inter-reference-RGB linear transformation matrix for converting the color-measured reference RGB values into the initial reference RGB values RdGdBd stored in the nonvolatile memory 125 or the like. The colorimetric value calculating unit 126 performs a calibration process on the color-measurement-target RGB value by using the inter-reference-RGB linear transformation matrix. Specifically, the colorimetric value calculating unit 126 converts the color-measurement-target RGB values into the initialization color-measurement-target RGB values RsGsBs by using the inter-reference-RGB linear transformation matrix.

Subsequently, the same processes as those explained with reference to FIG. 29 are performed by using the initialization color-measurement-target RGB values instead of the color-measurement-target RGB values. A difference from the processes in FIG. 29 is that the calibration process is performed before the estimated Lab values are obtained by the reference-value linear transformation matrix.

According to the embodiments, it is possible to realize stable color reproducibility with reduced distortion at low costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A color measuring device comprising:
an obtaining unit configured to obtain RGB values of an object whose color is to be measured;
a reference value storage unit configured to store reference colorimetric values and imaged reference RGB values in association with each other, the reference colorimetric values being device-independent colorimetric values of respective colors of reference color patches in a predetermined color space, the imaged reference RGB values being RGB values of the respective colors of the reference color patches that are obtained as the object by the obtaining unit;
a reference-value linear transformation matrix calculating unit configured to calculate a reference-value linear transformation matrix for converting the imaged reference RGB value into the reference colorimetric value for each of the reference color patches;

an imaged colorimetric value calculating unit configured to convert a color-measurement RGB value of a predetermined color measurement object obtained by the obtaining unit into an imaged colorimetric value by using the corresponding reference-value linear transformation matrix to calculate the imaged colorimetric value of the predetermined color measurement object;

a patch selecting unit configured to select a predetermined number of reference color patches of which the reference colorimetric values each have a close distance from the imaged colorimetric value in the predetermined color space, from among the reference color patches;

an RGB selecting unit configured to select, as selection RGB values, the imaged reference RGB values of the selected reference color patches;

a selection-RGB-value linear transformation matrix calculating unit configured to calculate a selection-RGB-value linear transformation matrix for converting the selection RGB values into the reference colorimetric values; and a colorimetric value converting unit configured to convert the color-measurement RGB value of the color measurement object obtained by the obtaining unit into a colorimetric value by using the selection-RGB-value linear transformation matrix.

2. The color measuring device according to claim 1, wherein
the obtaining unit captures an image of the object and a reference chart formed of a plurality of colors to obtain the RGB values of the object and RGB values of the reference chart,
the reference value storage unit stores the reference colorimetric values, the imaged reference RGB values, and initial reference RGB values in association with each other, the initial reference RGB values being RGB values of the reference chart captured by the obtaining unit together with the reference color patches,
the color measuring device further comprises
a color-measured RGB value storage unit configured to store the color-measurement RGB value of the predetermined color measurement object and a color-measured reference RGB value that is an RGB value of the reference chart captured together with the color measurement object;
an inter-reference-RGB linear transformation matrix generating unit configured to generate an inter-reference-RGB linear transformation matrix for converting the color-measured reference RGB value into the corresponding initial reference RGB value; and
an RGB value converting unit configured to convert the color-measurement RGB value into an initialization color-measurement RGB value by using the inter-reference-RGB linear transformation matrix, and
the imaged colorimetric value calculating unit converts the initialization color-measurement ROB value obtained by the RGB value converting unit into the imaged colorimetric value by using the corresponding reference-value linear transformation matrix to calculate the imaged colorimetric value of the predetermined color measurement object.

3. The color measuring device according to claim 2, wherein the reference chart contains an array of patches of some of the colors of the reference color patches.

4. The color measuring device according to claim 2, further comprising an averaging unit configured to calculate, as the color-measurement RGB value, an average of RGB values of the color measurement object obtained by the obtaining unit, for each predetermined color measurement target region.

5. The color measuring device according to claim 2, further comprising an averaging unit configured to calculate, as one or both of each of the initial reference RGB values and the color-measured reference RGB value, at least one of an average of the RGB values of the reference color patches and an average of the RGB values of the reference chart captured by the obtaining unit together with the color measurement object, for each predetermined imaging region of the reference chart.

6. An image forming apparatus comprising:
the color measuring device according to claim 1; and
an image forming unit configured to form an image by using color image data adjusted based on the colorimetric value converted by the colorimetric value converting unit of the color measuring device.

7. The image forming apparatus according to claim 6, wherein
the obtaining unit captures the object and a reference chart formed of a plurality of colors to obtain the RGB values of the object and RGB values of the reference chart,
the reference value storage unit stores the reference colorimetric values, the imaged reference RGB values, and initial reference RGB values in association with each other, the initial reference RGB values being RGB values of the reference chart captured by the obtaining unit together with the reference color patches,
the color measuring device further comprises
a color-measured RGB value storage unit configured to store the color-measurement RGB value of the predetermined color measurement object and a color-measured reference RGB value that is an RGB value of the reference chart captured together with the color measurement object;
an inter-reference-RGB linear transformation matrix generating unit configured to generate an inter-reference-RGB linear transformation matrix for converting the color-measured reference RGB value into the corresponding initial reference RGB value; and
an RGB value converting unit configured to convert the color-measurement RGB value into an initialization color-measurement RGB value by using the inter-reference-RGB linear transformation matrix, and
the imaged colorimetric value calculating unit converts the initialization color-measurement RGB value obtained by the RGB value converting unit into the imaged colorimetric value by using the corresponding reference-value linear transformation matrix to calculate the imaged colorimetric value of the predetermined color measurement object.

8. The image forming apparatus according to claim 7, wherein the reference chart contains an array of patches of some of the colors of the reference color patches.

9. The image forming apparatus according to claim 7, further comprising an averaging unit configured to calculate, as the color-measurement RGB value, an average of RGB values of the color measurement object obtained by the obtaining unit, for each predetermined color measurement target region.

10. The image forming apparatus according to claim 7, further comprising an averaging unit configured to calculate, as one or both of each of the initial reference RGB values and the color-measured reference RGB value, at least one of an average of the RGB values of the reference color patches and an average of the RGB values of the reference chart captured by the obtaining unit together with the color measurement object, for each predetermined imaging region of the reference chart.

11. A color measuring method comprising:
- obtaining RGB values of an object whose color is to be measured;
- storing reference colorimetric values and imaged reference RGB values in association with each other, the reference colorimetric values being device-independent colorimetric values of respective colors of reference color patches in a predetermined color space, the imaged reference RGB values being RGB values of the respective colors of the reference color patches that are obtained as the object at the obtaining;
- calculating a reference-value linear transformation matrix for converting the imaged reference RGB value into the reference colorimetric value for each of the reference color patches;
- converting a color-measurement RGB value of a predetermined color measurement object obtained at the obtaining into an imaged colorimetric value by using the corresponding reference-value linear transformation matrix to calculate the imaged colorimetric value of the predetermined color measurement object;
- selecting a predetermined number of reference color patches of which the reference colorimetric values each have a close distance from the imaged colorimetric value in the predetermined color space, from among the reference color patches;
- selecting, as selection RGB values, the imaged reference RGB values of the selected reference color patches;
- calculating a selection-RGB-value linear transformation matrix for converting the selection RGB values into the reference colorimetric values; and
- converting the color-measurement RGB value of the color measurement object obtained at the obtaining into a colorimetric value by using the selection-RGB-value linear transformation matrix.

12. A color measuring system comprising:
- an imaging device configured to obtain RGB values of an object whose color is to be measured; and
- a color measuring device connected to the imaging device via a predetermined communicating unit, wherein the color measuring device includes
  - a reference value storage unit configured to store reference colorimetric values and imaged reference RGB values in association with each other, the reference colorimetric values being device-independent colorimetric values of respective colors of reference color patches in a predetermined color space, the imaged reference RGB values being RGB values of the respective colors of the reference color patches that are obtained as the object by the imaging device;
  - a reference-value linear transformation matrix calculating unit configured to calculate a reference-value linear transformation matrix for converting the imaged reference RGB value into the reference colorimetric value for each of the reference color patches;
  - an imaged colorimetric value calculating unit configured to convert a color-measurement RGB value of a predetermined color measurement object obtained by the imaging device into an imaged colorimetric value by using the corresponding reference-value linear transformation matrix to calculate the imaged colorimetric value of the predetermined color measurement object;
  - a patch selecting unit configured to select a predetermined number of reference color patches of which the reference colorimetric values each have a close distance from the imaged colorimetric value in the predetermined color space, from among the reference color patches;
  - an RGB selecting unit configured to select, as selection RGB values, the imaged reference RGB values of the selected reference color patches;
  - a selection-RGB-value linear transformation matrix calculating unit configured to calculate a selection-RGB-value linear transformation matrix for converting the selection RGB values into the reference colorimetric values; and
  - a colorimetric value converting unit configured to convert the color-measurement RGB value of the color measurement object obtained by the imaging device into a colorimetric value by using the selection-RGB-value linear transformation matrix.

* * * * *